(12) United States Patent
Rabinowitz et al.

(10) Patent No.: US 7,692,587 B2
(45) Date of Patent: Apr. 6, 2010

(54) RAPID ACQUISITION AND CORRELATION OF SYNCHRONIZATION CODES FOR MOBILE DEVICES WITH LIMITED MEMORY AND COMPUTATIONAL POWER

(75) Inventors: Matthew Rabinowitz, Los Altos Hills, CA (US); Michael J. Sabin, Sunnyvale, CA (US); Jimmy K. Omura, San Francisco, CA (US)

(73) Assignee: Rosum Corporation, Sunnyvale, CA (US)

( * ) Notice: Subject to any disclaimer, the term of this patent is extended or adjusted under 35 U.S.C. 154(b) by 1535 days.

(21) Appl. No.: 10/946,070

(22) Filed: Sep. 22, 2004

(65) Prior Publication Data

US 2006/0061691 A1 Mar. 23, 2006

(51) Int. Cl.
*G01S 3/02* (2006.01)
(52) U.S. Cl. ...................... 342/458; 342/464
(58) Field of Classification Search ................ 342/458, 342/464
See application file for complete search history.

(56) References Cited

U.S. PATENT DOCUMENTS

| | | | | |
|---|---|---|---|---|
| 4,555,707 A * | 11/1985 | Connelly | .................. | 342/387 |
| 5,510,801 A * | 4/1996 | Engelbrecht et al. | ........ | 342/457 |
| 5,548,339 A * | 8/1996 | Kim | ............................ | 348/525 |
| 5,959,682 A * | 9/1999 | Kim et al. | ................... | 348/511 |
| 6,144,413 A * | 11/2000 | Zatsman | ..................... | 348/525 |
| 6,522,297 B1 * | 2/2003 | Rabinowitz et al. | ......... | 342/458 |
| 6,559,800 B2 * | 5/2003 | Rabinowitz et al. | ......... | 342/457 |
| 6,600,778 B1 * | 7/2003 | Nam | .......................... | 375/232 |
| 7,269,424 B2 * | 9/2007 | Camp, Jr. | ................. | 455/456.1 |
| 2004/0114701 A1 * | 6/2004 | Markman | ................... | 375/371 |

FOREIGN PATENT DOCUMENTS

| | | | |
|---|---|---|---|
| DE | 3242997 A1 * | 5/1984 | |
| GB | 2222922 A * | 3/1990 | |
| GB | 2254508 A * | 10/1992 | |

OTHER PUBLICATIONS

Rabinowitz et al, "Positioning Using the ATSC Digital Television Signal," Rosum Corporation, White Paper 2001.*

* cited by examiner

*Primary Examiner*—Gregory C Issing
(74) *Attorney, Agent, or Firm*—McDermott Will & Emery LLP

(57) ABSTRACT

The present invention provides a method, system, and apparatus for rapidly acquiring and correlating synchronization codes for a mobile receiver used for position determination purposes. The receiver uses a processing unit to perform the correlation functions. The processing unit first computes, for each segment interval of the received signal, the phase offset of that interval. Each interval is appropriately adjusted to account for the computed phase offset. The processing unit then accumulates the phase-adjusted segment intervals, and may down-convert the accumulated signal to a baseband format from an intermediate frequency. The processing unit then correlates the accumulated signal with a reference signal to produce a correlation peak, from which the time delay of a synchronization code within the interval can be calculated. Ultimately, the receiver's position can be determined based on the calculated time delay.

63 Claims, 16 Drawing Sheets

RAPID ACQUISITION AND CORRELATION OF SYNCHRONIZATION CODES FOR MOBILE DEVICES WITH LIMITED MEMORY AND COMPUTATIONAL POWER

CROSS-REFERENCES TO RELATED APPLICATIONS

This application is related to U.S. Non-provisional patent application Ser. No. 10/003,128, "Robust Data Transmission Using Broadcast Digital Television Signals," by Jimmy K. Omura, James J. Spilker, Jr. and Matthew Rabinowitz, filed Nov. 14, 2001; U.S. Non-provisional patent application Ser. No. 09/887,158, "Position Location using Broadcast Digital Television Signals," by James J. Spilker and Matthew Rabinowitz, filed Jun. 21, 2001; U.S. Non-provisional patent application Ser. No. 09/932,010, "Position Location using Terrestrial Digital Video Broadcast Television Signals," by James J. Spilker and Matthew Rabinowitz, filed Aug. 17, 2001; U.S. Non-provisional patent application Ser. No. 10/054,302, "Position Location using Broadcast Analog Television Signals," by James J. Spilker and Matthew Rabinowitz, filed Jan. 22, 2002; U.S. Non-provisional patent applications Ser. No. 10/353,699 "Position Location Using Ghost Canceling Reference Television Signals," by James J. Spilker and Matthew Rabinowitz, filed Jan. 28, 2003 and U.S. Non-provisional patent application Ser. No. 10/054,262, "Time-Gated Delay Lock Loop Tracking Of Digital Television Signals," by James J. Spilker and Matthew Rabinowitz, filed Jan. 22, 2002; U.S. patent application Ser. No. 10/159,478, "Position Location using Global Positioning Signals Augmented by Broadcast Television Signals," by Matthew Rabinowitz and James J. Spilker, filed May 31, 2002; and U.S. Non-provisional patent applications Ser. No. 10/290,984 "Position Location using Integrated Services Digital Broadcasting—Terrestrial (ISDB-T) Broadcast Television Signals," by James J. Spilker and Matthew Rabinowitz, filed Nov. 8, 2002; U.S. patent application Ser. No. 10/292,975, "Radio Frequency Device for Receiving TV Signals and GPS Satellite Signals and Performing Positioning," by Matthew Rabinowitz and James J. Spilker, filed Nov. 13, 2002; the disclosures thereof are incorporated by reference herein in their entirety.

INCORPORATION BY REFERENCE

This application hereby incorporates by reference in its entirety for following documents: 1) B. Parkinson and J. Spilker, Jr. Global Positioning System-Theory and Applications, AIAA, Washington, D.C., 1996, Vol. 1, Chapter 17 Tropospheric Effects on GPS by J. Spilker, Jr., 2) J. Spilker, Jr., Digital Communications by Satellite, Prentice-Hall, Englewood Cliffs, N.J., 1977, 1995, and 3) B. W. Parkinson and J. Spilker, Jr., Global Positioning System-Theory and Application, Volume 1, AIAA, Washington, D.C. 1996.

BACKGROUND OF THE INVENTION

1. Field of the Invention

The present invention relates generally to position location, and specifically to a receiver that enables the reception of television and GPS signals for the purpose of position determination.

2. Description of the Related Art

The Global Positioning System (GPS) technology has revolutionized the field of navigation and position location. Initially devised in 1974, the GPS is based on a constellation of 24 on-orbit satellites in 12 hour circular, inclined orbits. Each satellite transmits a known pseudo-noise signal synchronized to an on-board precision atomic clock. The transmitted pseudo-noise signals can be precisely tracked by a receiver at an unknown location to determine pseudo-ranges. By tracking four or more satellites, one can determine precise position in three dimensions in real time, world-wide. More details on the operation of GPS are provided in (1) B. W. Parkinson and J. J. Spilker, Jr., Global Positioning System-Theory and Applications, Volumes I and II, AIAA, Washington, D.C. 1996, and (2) J. Spilker, Jr., Digital Communications by Satellite, Prentice-Hall, Englewood Cliffs, N.J., 1977, 1995, which are incorporated by reference herein in their entirety.

However, the effectiveness of GPS is limited in some situations. Because the GPS signals are transmitted at relatively low power levels (less than 100 watts) and over great distances, the received signal strength is relatively weak (on the order of −160 dBW as received by an omni-directional antenna). Thus the signal is marginally useful or not useful at all in the presence of line-of-sight blockage or while the receiver is inside a building.

This limitation or shortcoming of GPS technology can be overcome or ameliorated by employing position location technologies based on receiving broadcast television signals. High power, high bandwidth, and superior geometries make various broadcast television signals ideal candidates for augmenting or improving position location where the GPS technology fails. For example, various digital television (DTV) broadcast signals contain embedded synchronization codes which can be used for position determination purposes. The ATSC standard in the United States, the DVB standard in Europe, and the ISDB-T standard in Japan all employ an embedded synchronization code which is used to probe the transmission channel and mitigate the effects of multipath in a digital TV receiver. In order to be effective for channel modeling and multipath mitigation, these synchronization codes have wide bandwidths, narrow time autocorrelation functions, and high power levels. These features make these synchronization codes ideal for positioning, in particular for indoors positioning where multipath effects are severe and GPS signals may not penetrate. In addition, the Ghost-Canceling Reference (GCR) signals embedded in analog television broadcasts can be used for precise ranging. In recent years, analog television broadcasts have started to insert into their broadcasts a synchronization code termed the Ghost-Canceling Reference, which is used for multipath mitigation on analog signals in TV receivers that digitize the signal. High power characteristics and wide availability of GCR signals make them suitable for position location. Other test signals inserted in the analog broadcasts, such as the multiburst signal, may also be used for position determination. In the GPS system, autocorrelation of a known Pseudo-Random-Number (PRN) sequence signal (i.e., a pseudo-noise signal) is used to determine pseudo-ranges. Other test signals inserted in the analog broadcasts, such as the multiburst signal, may also be used for positioning.

There has even been a proposed system using conventional analog National Television System Committee (NTSC) television signals to determine position. This proposal is found in a U.S. Patent entitled "Location Determination System And Method Using Television Broadcast Signals," U.S. Pat. No. 5,510,801, issued Apr. 23, 1996. However, the technique described the use of the horizontal and vertical synchronization pulses which were intended only for relatively crude synchronization of the TV set sweep circuitry, and cannot achieve the level of positioning accuracy or reliability of the disclosed location technology. Further, in 2006 the Federal Communication Commission (FCC) will consider turning off NTSC transmitters and reassigning that valuable spectrum so that it can be auctioned for other purposes deemed more valuable.

A strong emphasis is being placed on the mobile user for the type of services that DTV can provide. For example, efforts are ongoing in Korea and Japan to generate cellular handsets which include television tuners for the purpose of receiving television on the mobile device as well as data conveyed using the DTV channel. A correct design of the receiver architecture, as described in this disclosure will enable data reception, as well as location using TV signals in combination with GPS.

One problem with conventional position determination technology relates to the capacity and processing circuitry of the user device. The computations to ultimately determine position location, particularly when using both GPS and television signals, can be complex to say the least. In many instances, the position location technology is placed in a compact mobile device. A typical mobile device has finite processing power, limited analog front end sophistication, a relatively limited power source and restricted memory capacity. In the case of a handheld receiver or telephone with receiver functionality for position location, a limited amount of real estate may exist on the printed circuit board(s) to implement sophisticated circuitry for managing receiver functions. Additionally, the more circuitry designed onto the card, generally the greater the battery consumption, which may be especially undesirable for mobile devices such as transceivers or cellular telephones.

These problems and limitations that exist with mobile devices are exacerbated in light of the objective that the receiver perform position computations in as close to real time as possible. This may be especially true where the user device is in motion, and it is desirable to obtain as high a quality position measurement as possible. An effective method and system is needed to perform the required computations for position location as expediently as possible and using minimal computational requirements given the limitations on size, memory capacity, and processing power on many of these user devices.

To this end, one possible approach is to employ a "software" based receiver device which uses, in addition to an analog front end for receiving, filtering, amplifying and digitizing the broadcast television signal, a processor such as a DSP or microprocessor to sample a sequence of the downconverted broadcast signal, and then to process the sample by executing necessary routines that manipulate the digitized signal. Such a software implementation, designed properly, can have the advantages of mitigating multipath interference and reducing the complexity of circuitry on the integrated circuits that are embedded within the mobile device. However, given the critical timing requirements and relative sophistication of a digital broadcast signal, even a solution using a processor or DSP to perform primary correlation functions can produce inaccurate results, and without any appreciable decrease in computational requirements. Additionally, the traditional correlation process for identifying time offsets between transmissions of a known code sequence and its arrival at a mobile receiver can add considerable complexity into the mix. In particular, for each signal segment interval (e.g., a single packet of information in a television broadcast signal), a separate correlation operation may need to be performed to extract timing information from each segment. As the number of intervals increase, the number of required correlation operations likewise increases, which taxes the processing unit of the receiver and limits the capability of smaller mobile devices to produce position-related information (either for itself or a location server or other computing device) in near real time as is highly desirable in such mobile applications.

As the demand for progressively smaller and more compact mobile devices continues, it becomes more desirable and advantageous to implement a processor-based solution that eliminates much of the hardware otherwise necessary to process the signal and extract critical timing information for purposes of position location. Accordingly, a need exists in the art to provide a receiver device capable of using one or more processor(s) in a manner that reduces computational load and results in accurate position determination in near real time without consuming unnecessary power or overtaxing the memory capacity of the device.

SUMMARY OF THE INVENTION

The present invention addresses the foregoing need of providing a robust and efficient solution for the rapid acquisition and correlation of synchronization codes or other known sequences embedded in television signals in a receiving device for determining position location. In addition to the conventional analog front end circuitry for receiving, filtering and amplifying the incoming television signal and/or GPS signal, a processing device (or set thereof) is included for estimating correlation peaks using software routines. In one embodiment, the traditional order of operations associated with processing a television signal is effectively reversed such that: phase offsets of incoming signal intervals are computed by the software; a resulting expression is accumulated adjusting the intervals to correct for the phase offsets; the resulting expression is downconverted to substantially a baseband format; and a complex correlation is performed between the resulting downconverted signal and the known sequence to determine an appropriate correlation peak for calculating a pseudo-range used in position determination.

In one aspect of the present invention, a method of determining, at a receiving device used for position location, a correlation peak of a broadband television waveform comprises a plurality of segment intervals, each segment interval comprising a known signal component, the method comprising: estimating segment phase changes for each of the segment intervals; accumulating phase-corrected segment intervals to form an accumulated expression; converting the accumulated expression to a baseband signal; and correlating the accumulated baseband signal with the known signal component to determine an associated correlation peak.

In another aspect of the invention, a method for calculating a transmission time of a known component of a television signal from a transmitter to a mobile receiver comprises: receiving packets comprising N successive segment intervals of the television signal at an antenna at the mobile receiver, each segment interval comprising a period of approximately T seconds; amplifying and filtering the N segment intervals; digitizing the N segment intervals using at least one analog-to-digital converter; estimating, for each of the N segment intervals using a processing unit, a corresponding set of phase offsets $\underline{\phi}=(\phi_0,\phi_1,\phi_2,\ldots,\phi_{N-1})$; adjusting the phase of each of the N segment intervals using $\underline{\phi}$; accumulating the phase-adjusted N segment intervals over the period T; correlating the accumulated N segment intervals with a reference waveform comprising the known component; and using the correlation output to estimate the transmission time.

In yet another aspect of the invention, computer-readable media embodying a program of instructions executable by a computer program performs a method of determining, at a receiving device used for position location, a correlation peak of a broadband television waveform comprising a plurality of segment intervals, each segment interval comprising a known signal component, the method comprising: estimating segment phase changes for each of the segment intervals; accumulating phase-corrected segment intervals to form an accumulated expression; converting the accumulated expression to a baseband signal; and correlating the accumulated baseband signal with the known signal component to determine an associated correlation peak.

In still another aspect of the invention, a mobile receiving apparatus for use in determining position location based in part on a broadcast television signal comprising a plurality of successive segment intervals, each interval comprising a known signal component, comprises: (a) a power source; (b) an antenna for receiving the signal; (c) tuning means for selecting the desired television signal; (d) filtering and amplifying means; (e) an analog-to-digital converter for digitizing the television signal; and (f) a processing unit for (i) estimating segment phase changes for each of the segment intervals; (ii) accumulating phase-corrected segment intervals to form an accumulated expression; and (iii) correlating the accumulated baseband signal with the known signal component to produce an associated correlation output function.

Other and further objects and advantages of the present invention will be further understood and appreciated by those skilled in the art by reference to the following specification, claims, and drawings.

DETAILED DESCRIPTION OF THE PREFERRED EMBODIMENT

In general, in one aspect, the invention features a method and apparatus for receiving TV and GPS signals and determining position location in a manner that provides for rapid signal synchronization while minimizing receiver computational requirements. The invention also features a method and apparatus for coherent accumulation of intermediate frequency (IF) signals, which in turn permits real time or near real-time operation using a software implementation of the receiver. The receiver described herein can be a receiver used either solely for receiving terrestrial or television broadcast signals, for receiving both television and GPS signals, or for receiving different types of television broadcast signals for position determination purposes. In certain embodiments, the receiver described herein is implemented in software on a microprocessor or general purpose CPU. In other embodiments, the receiver may be implemented using one or more dedicated integrated circuits which may include digital signal processors, application-specific integrated circuits (ASICs), programmable logic devices, and the like. In one embodiment, the user device employs a digital signal processor (DSP) programmed to perform the computations for pseudo-range determination and position location on mobile devices.

The receiver as described herein need not be limited to a handheld receiver, but may also encompass other types of receivers, including those in automobiles or other transport mechanisms (such as airplanes, etc.). The term receiver is intended to broadly encompass all such classes of device which contain the functionality for receiving and properly interpreting broadcast television and/or GPS signals for the purpose of calculating location, whether alone or in conjunction with other devices or server-based equipment.

Figure 1:
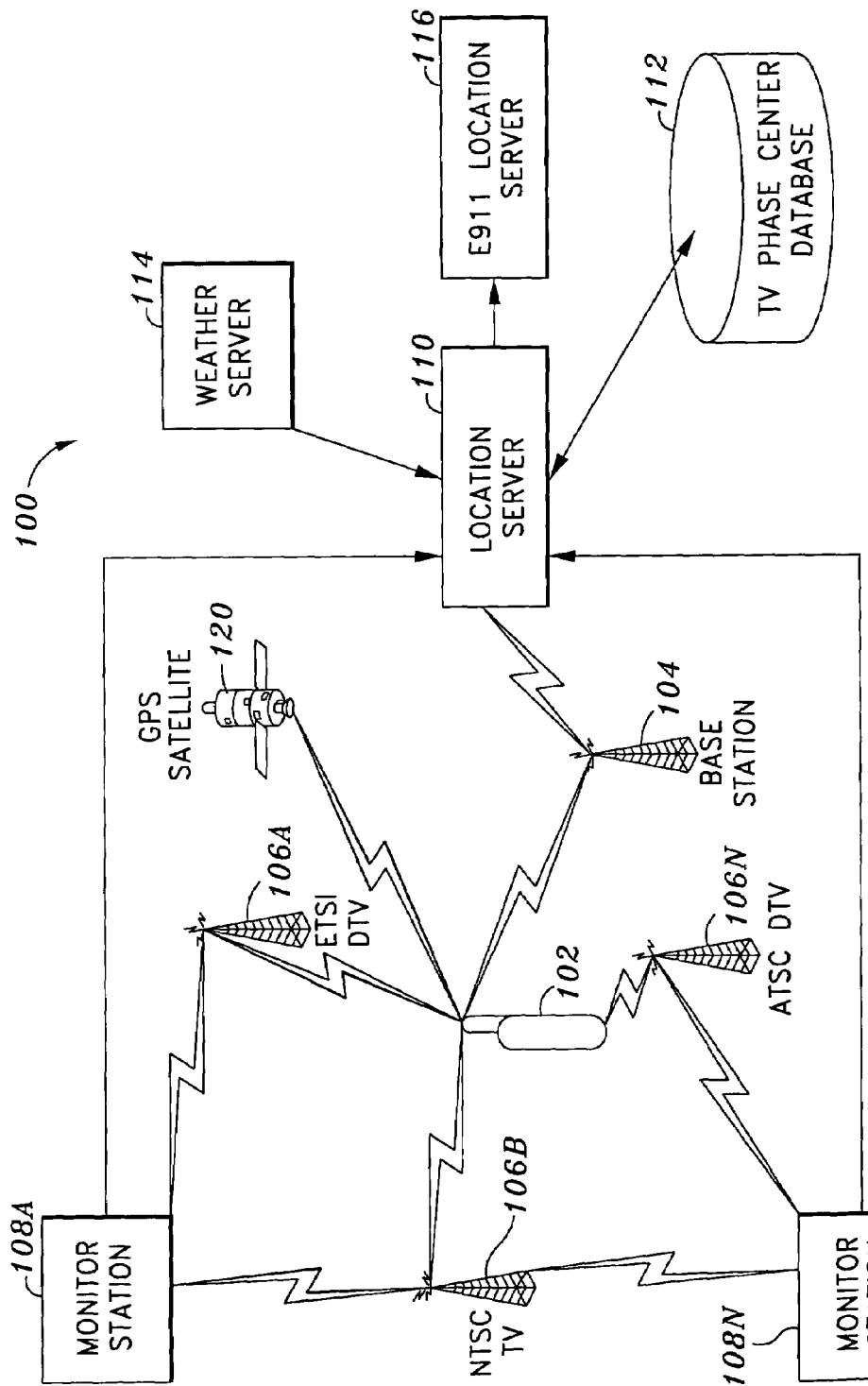
FIG. 1 illustrates an overview of a system environment in which the present invention is implemented.

FIG. 1 illustrates an overview of a system environment in which the present invention may be implemented. FIG. 1 is merely an example of one of many possible system implementations in which the present invention finds utility, and a variety of other solutions or configurations may be contemplated without departing from the scope of the invention. As shown in FIG. 1, user terminal 102 communicates over an air link with a base station 104. In one embodiment, the user terminal 102 is a wireless telephone and the base station 104 is a wireless telephone base station. Base station 104 can be a part of a mobile metropolitan area network ("MAN") or a wide area network ("WAN") without departing from the scope of the present invention. Additionally, the phrases "mobile receiver," "user terminal," "user device" or "mobile device" refer to any device capable of implementing the position determination techniques described herein. Examples of user terminals include PDAs (Personal Digital Assistants), mobile phones, cars and other vehicles, and any object which could include a chip or software implementing the position determination techniques described herein. Further, the terms "user terminal" or "mobile device" are not intended to be limited to units which are "terminals" or which are operated by "users."

Position Location Performed by a Location Server

Figure 2:
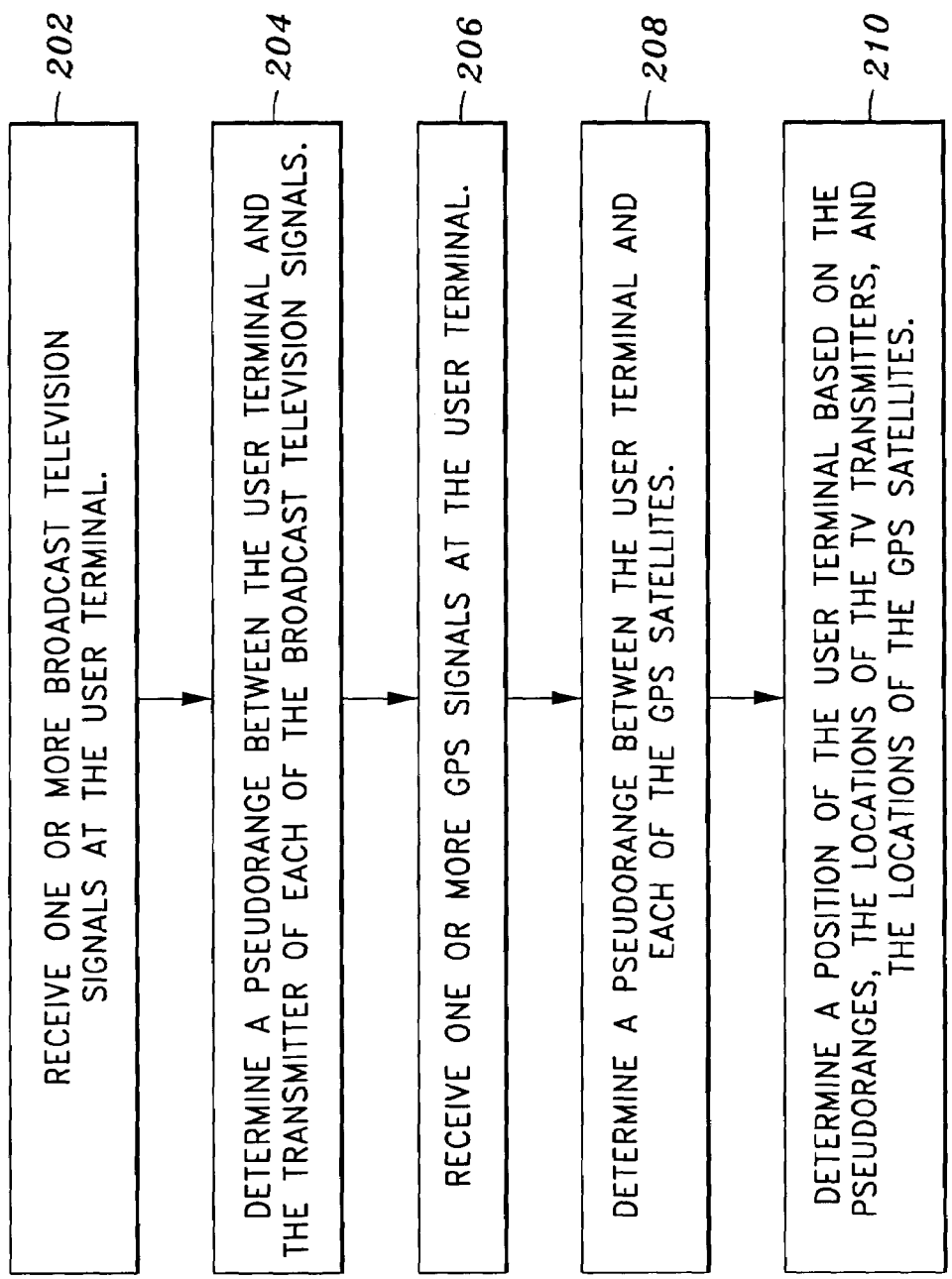
FIG. 2 illustrates a flow chart in accordance with the present invention.

FIG. 2 illustrates an operation of the implementation 100 shown in FIG. 1. User terminal 102 receives broadcast signals from one or more TV transmitters 106A and 106B through 106N (step 202). Referring to FIG. 1, TV transmitter 106A is an ETSI transmitter, TV transmitter 106B is an NTSC transmitter, and TV transmitter 106N is an ATSC transmitter, although other combinations may be contemplated, including, for example, transmitters of the ISDB signal used in Japan.

Various methods can be used to select which TV channels to use in position location. In one implementation, a location server 110 tells user terminal 102 of the best TV channels to monitor. In some implementations, user terminal 102 exchanges messages with location server 110 by way of base station 104. User terminal 102 may select TV channels to monitor based on the identity of base station 104 and a stored table correlating base stations and TV channels. In some implementations, user terminal 102 can accept a location input from the user that provides a general indication of the location of the user terminal, such as the name of the nearest city; and uses this information to select TV channels for processing. User terminal 102 may scan available TV channels to assemble a fingerprint of the location based on power levels of the available TV channels. User terminal 102 compares this fingerprint to a stored table that matches known fingerprints with known locations to select TV channels for processing. This selection may be based on the power levels of the DTV channels, as well as the directions from which each of the signals are arriving, so as to minimize the dilution of precision (DOP) for the position calculation.

User terminal 102 determines a pseudo-range between the user terminal and each TV transmitter 106 (step 204). Each pseudo-range represents the time difference (or equivalent distance) between a time of transmission from a transmitter 106 of a component of the TV broadcast signal and a time of reception at the user terminal 102 of the component, as well as a clock offset at the user terminal.

User terminal 102 may transmit the pseudo-ranges to location server 110. In certain implementations, location server 110 is implemented as a general-purpose computer executing software designed to perform the operations described herein. In another implementation, location server is implemented as one or more ASICs (application-specific integrated circuit), DSPs or other circuit or device. In one embodiment, location server 110 is implemented within or near base station 104.

The TV signals are also received by a plurality of monitor units 108A through 108N. Each monitor unit 108 can be implemented as a small unit including a transceiver and processor, and can be mounted in a convenient location such as on a utility pole, TV transmitter 106, base station 104, or the like. In still other implementations, monitor units 108 may be implemented on satellites.

Each monitor unit 108 measures, for each of the TV transmitters 106 from which it receives TV signals, a time offset between the local clock of that TV transmitter and a reference clock. In some implementations the reference clock is derived from GPS signals. The use of a reference clock permits the determination of the time offset for each TV transmitter 106 when multiple monitor units 108 are used, since each monitor unit 108 can determine the time offset with respect to the reference clock. Thus, offsets in the local clocks of the monitor units 108 do not affect these determinations. Monitor units 108 are described in greater detail in U.S. Ser. Nos. 09/887, 158, 09/932,010, and 10/054,302, the disclosures thereof which are incorporated by reference herein in their entirety.

In another implementation, no external time reference is needed. According to this implementation, a single monitor unit 108 receives TV signals from all of the same TV transmitters as does user terminal 102. In effect, the local clock of the single monitor unit functions as the time reference.

In some implementations, each time offset is modeled as a fixed offset. In another implementation each time offset is modeled as a second order polynomial fit of the form $$T_{offset}(t) = a + b(t - T_o) + c(t - T_o)^2 \quad (1)$$

that can be described by parameters a, b, c, and $T_o$ with t as the time variable. In either implementation, each measured time offset may be transmitted periodically to the location server 110 using the Internet, a secured modem connection, as part of the actual DTV broadcast data, or the like. In some implementations, the location of each monitor unit 108 is determined using GPS receivers.

Location server 110 receives information describing the phase center (i.e., the location) of each TV transmitter 106 from a database 112. In some implementations, the phase center of each TV transmitter 106 is measured by using monitor units 108 at different locations to measure the phase center directly. In another implementation, the phase center of each TV transmitter 106 is measured by surveying the antenna phase center.

In some implementations, location server 110 receives weather information describing the air temperature, atmospheric pressure, and humidity in the vicinity of user terminal 102 from a weather server 114. The weather information is available from the Internet and other sources such as NOAA. Location server 110 determines tropospheric propagation velocity from the weather information using techniques such as those disclosed in B. Parkinson and J. Spilker, Jr. Global Positioning System-Theory and Applications, AIAA, Washington, D.C., 1996, Vol. 1, Chapter 17 Tropospheric Effects on GPS by J. Spilker, Jr.

Location server 110 can also receive from base station 104 information which identifies a general geographic location of user terminal 102. For example, in a cellular application, the information can identify a cell or cell sector within which a cellular telephone is located. This information may be used, among other purposes, for ambiguity resolution.

User terminal 102 receives GPS signals from one or more GPS satellites 120 (step 206). User terminal 102 also receives almanac data describing Doppler shifts and pseudo-noise numbers for GPS satellites 120, as described below. User terminal 102 determines a pseudo-range between the user terminal and each GPS satellite 120 (step 208). Each pseudo-range represents the time difference (or equivalent distance) between a time of transmission from a GPS satellite 120 of a component of the GPS signal and a time of reception at the user terminal 102 of the component, as well as a clock offset, e.g., at the GPS satellite. In this implementation, user terminal 102 transmits the pseudo-ranges to location server 110.

Figure 3:
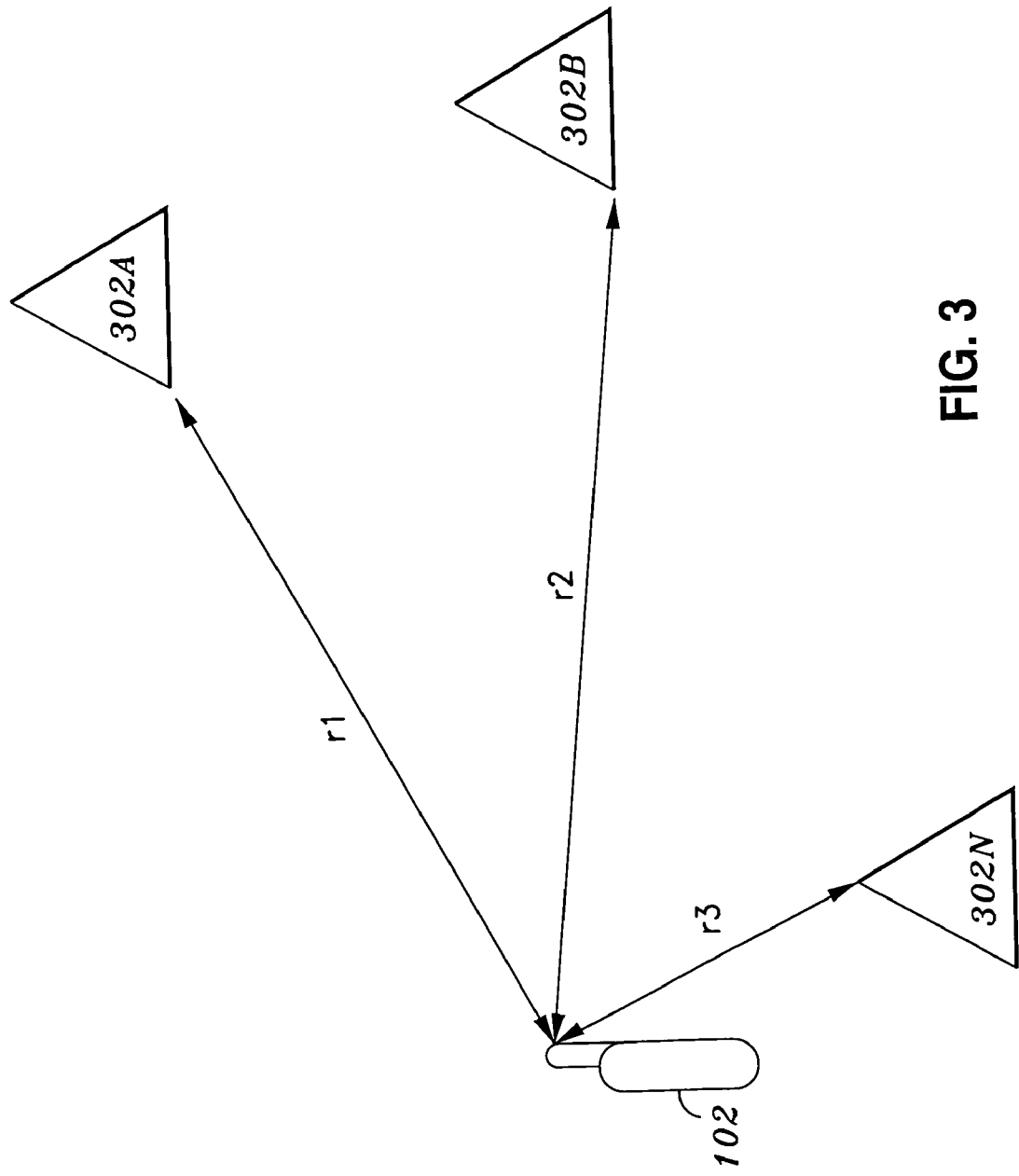
FIG. 3 depicts the geometry of a position determination using 3 DTV transmitters.

Location server 110 determines a position of the user terminal based on the pseudo-ranges, a location of each of the TV transmitters 106, and a location of the GPS satellites 120 (step 210). FIG. 3 depicts the geometry of a position determination using three transmitters 302. Transmitters 302 can be all TV transmitters, all GPS transmitters, or any combination thereof. Transmitter 302A is located at position $(x_1, y_1, z_1)$. The range between user terminal 102 and transmitter 302A is $r_1$. Transmitter 302B is located at position $(x_2, y_2, z_2)$. The range between user terminal 102 and transmitter 302B is $r_2$. Transmitter 302N is located at position $(x_3, y_3, z_3)$. The range between user terminal 102 and transmitter 302N is $r_3$.

Location server 110 may adjust the value of each pseudo-range according to the tropospheric propagation velocity and the time offset for the corresponding transmitter 302. Location server 110 uses the phase center information from database 112 to determine the position of each transmitter 302.

User terminal 102 makes three or more pseudo-range measurements to solve for three unknowns, namely the position (x, y) and clock offset $T_{offset}(t)$, which in this embodiment represents a clock offset of user terminal 102. It is assumed that the altitude of the user terminal is known to within the necessary degree of accuracy and only the latitude and longitude of the user terminal need to be precisely determined. Of course, it is possible to solve for position of the user terminal in three dimensions, namely (x, y, z) assuming that four or more transmitters are available, and the geometry of those transmitters is sufficient. It would be clear to one skilled in the art how to adjust the techniques described herein for a 3-Dimensional position fix.

The three pseudo-range measurements $pr_1$, $pr_2$ and $pr_3$ are given by $$pr_1 = r_1 + T_{offset}(t) \tag{2a}$$

$$pr_2 = r_2 + T_{offset}(t) \tag{3a}$$

$$pr_3 = r_3 + T_{offset}(t) \tag{4a}$$

The three ranges can be expressed as $$r_1 = |X - X_1| \tag{5}$$

$$r_2 = |X - X_2| \tag{6}$$

$$r_3 = |X - X_3| \tag{7}$$

where X represents the three-dimensional vector position (x, y, z) of user terminal, $X_1$ represents the three-dimensional vector position $(x_1, y_1, z_1)$ of transmitter 302A, $X_2$ represents the three-dimensional vector position) $(x_2, y_2, z_2)$ of transmitter 302B, and $X_3$ represents the three-dimensional vector position $(x_3, y_3, z_3)$ of transmitter 302N. These relationships produce three equations in which to solve for the three unknowns x, y, and $T_{offset}(t)$. Notice that in the case that only latitude and longitude are required, location server 110 assumes some estimate for z and does not solve for it as for the other unknown co-ordinates. In one implementation, using a terrain map, the initial estimate of z can be iteratively refined based on the computed values for x and y. In another implementation, location server 110 actively solves for z. Location server 110 solves these equations according to conventional well-known methods. In an E911 application, the position of user terminal 102 is transmitted to E911 location server 116 for distribution to the proper authorities. In another application, the position is transmitted to user terminal 102.

A high quality oscillator in the user device generally cannot be assumed. Therefore, techniques for projecting the measurements at the user terminal 102 to a common instant in time (common time instant) are described. Note that this is not necessary if the clock of the user terminal 102 is stabilized or corrected using a signal from the cellular base station or a DTV transmitter 106. In cases where the user clock is not stabilized, or corrected, the user clock offset can be considered to be a function of time, $T_{offset}(t)$. For a small time interval, $\Delta$, the clock offset, $T_{offset}(t)$, can be modeled by a constant and a first order term. Namely, $$T_{offset}(t+\Delta) = T_{offset}(t) + b\Delta \tag{8}$$

where c=0 in the polynomial fit of equation (1).

We now reconsider equations (2a)-(4a) treating the clock offset as a function of time. Consequently, the pseudo-range measurements are also a function of time. For clarity, we assume that the ranges remain essentially constant over the interval $\Delta$. The pseudo-range measurements may be described as:

$$pr_1(t_1) = r_1 + T_{offset}(t_1) \tag{2b}$$

$$pr_2(t_2) = r_2 + T_{offset}(t_2) \tag{3b}$$

$$pr_N(t_N) = r_N + T_{offset}(t_N) \tag{4b}$$

In one embodiment, the user terminal 102 commences with an additional set of pseudo-range measurements at some time $\Delta$ after the initial set of measurements. These measurements may be described:

$$pr_1(t_1+\Delta) = r_1 + T_{offset}(t_1) + b\Delta \tag{2c}$$

$$pr_2(t_2+\Delta) = r_2 + T_{offset}(t_2) + b\Delta \tag{3c}$$

$$pr_N(t_N+\Delta) = r_N + T_{offset}(t_N) + b\Delta \tag{4c}$$

The user terminal 102 then projects all the pseudo-range measurements to some common point in time (common time instant) so that the effect of the first order term is effectively eliminated. For example, consider if some common reference time $t_0$ is used. Applying equations (2b-4b) and (2c-4c) it is straightforward to show that we can project the measurements to a common instant of time as follows:

$$pr_1(t_0) = pr_1(t_1) + [pr_1(t_1+\Delta) - pr_1(t_1)](t_0-t_1)/\Delta \tag{2d}$$

$$pr_2(t_0) = pr_2(t_2) + [pr_2(t_2+\Delta) - pr_2(t_2)](t_0-t_2)/\Delta \tag{3d}$$

$$pr_N(t_0) = pr_N(t_N) + [pr_N(t_N+\Delta) - pr_N(t_N)](t_0-t_N)/\Delta \tag{4d}$$

These projected pseudo-range measurements are communicated to the location server where they are used to solve the three unknowns x, y, and $T_{offset}(t_0)$. Note that the projection in equations (2d-4d) is not precise, and second order terms are not accounted for since we assume c=0 in equation (1). However the resulting errors are not significant. One skilled in the art will recognize that second order and higher terms may be accounted for, if necessary, by making more than two pseudo-range measurements for each projection. Notice also that there are many other approaches to implementing this concept of projecting the pseudo-range measurements to the same instant of time. One approach, for example, is to implement a delay lock loop such as those disclosed in J. J. Spilker, Jr., Digital Communications by Satellite, Prentice-Hall, Englewood Cliffs, N.J., 1977, 1995 and B. W. Parkinson and J. J. Spilker, Jr., Global Positioning System-Theory and Application, Volume 1, AIAA, Washington, D.C. 1996, both incorporated by reference herein. A separate tracking loop can be dedicated to each DTV transmitter 106. These tracking loops effectively interpolate between pseudo-range measurements. The state of each of these tracking loops is sampled at the same instant of time.

In some implementations, user terminal 102 does not compute pseudo-ranges, but rather takes measurements of the signals that are sufficient to compute pseudo-range, such as a set of correlator outputs, and transmits these measurements to location server 110. Location server 110 then computes the pseudo-ranges based on the measurements, and computes the position based on the pseudo-ranges, as described above. The computation of correlator outputs sufficient to produce positioning information is discussed further, below.

Position Location Performed by User Terminal

In some implementations, the position of user terminal 102 is computed by user terminal 102. In this implementation, all of the necessary information is transmitted to user terminal 102. This information can be transmitted to user terminal by location server 110, base station 104, one or more TV transmitters 106, GPS satellites 120, or any combination thereof. User terminal 102 then measures the pseudo-ranges and solves the simultaneous equations as described above. This implementation is now described.

User terminal 102 receives the time offset between the local clock of each TV transmitter 106 and a reference clock. User terminal 102 also receives information describing the phase center of each TV transmitter 106 from a database 112.

User terminal 102 receives the tropospheric propagation velocity computed by location server 110. In some implementation, user terminal 102 receives weather information describing the air temperature, atmospheric pressure, and humidity in the vicinity of user terminal 102 from a weather server 114, and determines tropospheric propagation velocity from the weather information using conventional techniques.

User terminal 102 can also receive from base station 104 information which identifies the rough location of user terminal 102. For example, the information can identify a cell or cell sector within which a cellular telephone is located. This information may be used, for example, for ambiguity resolution.

User terminal 102 receives TV signals from one or more TV transmitters 106 and determines a pseudo-range between the user terminal 102 and each TV transmitter 106. User terminal 102 receives GPS signals from one or more GPS satellites 120 and almanac data describing Doppler shifts and pseudo-noise code numbers for the GPS satellites, as described below, and determines pseudo-ranges between the user terminal 102 and the GPS satellites 120. User terminal 102 then determines its position based on the pseudo-ranges, the locations of the TV transmitters 106, and the locations of the GPS satellites 120.

In any of these implementations, the position of user terminal 102 can be determined using a TV transmitter and the offset T computed during a previous position determination for that TV transmitter. The values of T can be stored or maintained according to conventional methods.

In some implementations, base station 104 determines the clock offset of user terminal 102. Only two transmitters are required in these instances for position determination. Base station 104 transmits the clock offset T to location server 110, which then determines the position of user terminal 102 from the pseudo-range computed for each of the transmitters.

Receiver Signal Processing Architecture

The signal processing for both TV and GPS signals can be performed either using correlation of short samples of the received digitized signals or by using a delay-lock loop or time-gated delay lock loop. Such delay lock loop techniques are disclosed in commonly-owned copending U.S. Non-provisional patent application Ser. No. 10/054,262, "Time-Gated Delay Lock Loop Tracking Of Digital Television Signals," by James J. Spilker and Matthew Rabinowitz, filed Jan. 22, 2002, the disclosure thereof incorporated by reference herein in its entirety. As described in greater detail below, this disclosure will consider the application of determining pseudo-ranges based on appropriately-applied correlation methods.

Figure 4:
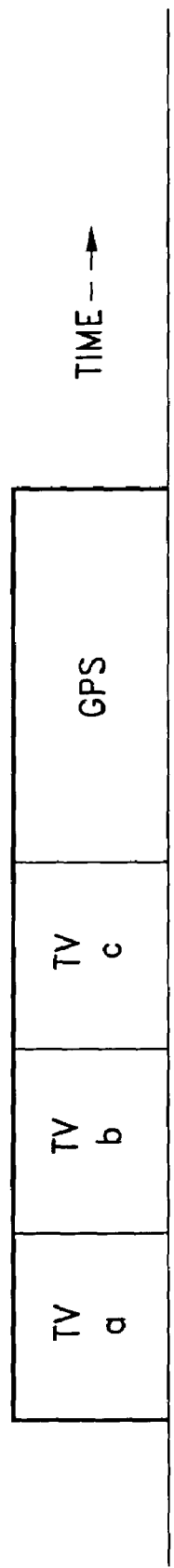
FIG. 4 shows a time switching sequence for an integrated TV/GPS receiver according to some implementations.

FIG. 4 shows a time-switching sequence for an integrated TV/GPS receiver in a user terminal according to some implementations. The receiver time sequences over the various signal sources changing the TV channel frequencies to examine three TV signals (TVa, TVb, and TVc) in this example and then switching to the GPS band to examine one or more GPS signals. Of course, when tuned to the GPS band, the receiver can correlate any of the GPS satellites and multiple GPS satellites concurrently.

Figure 5:
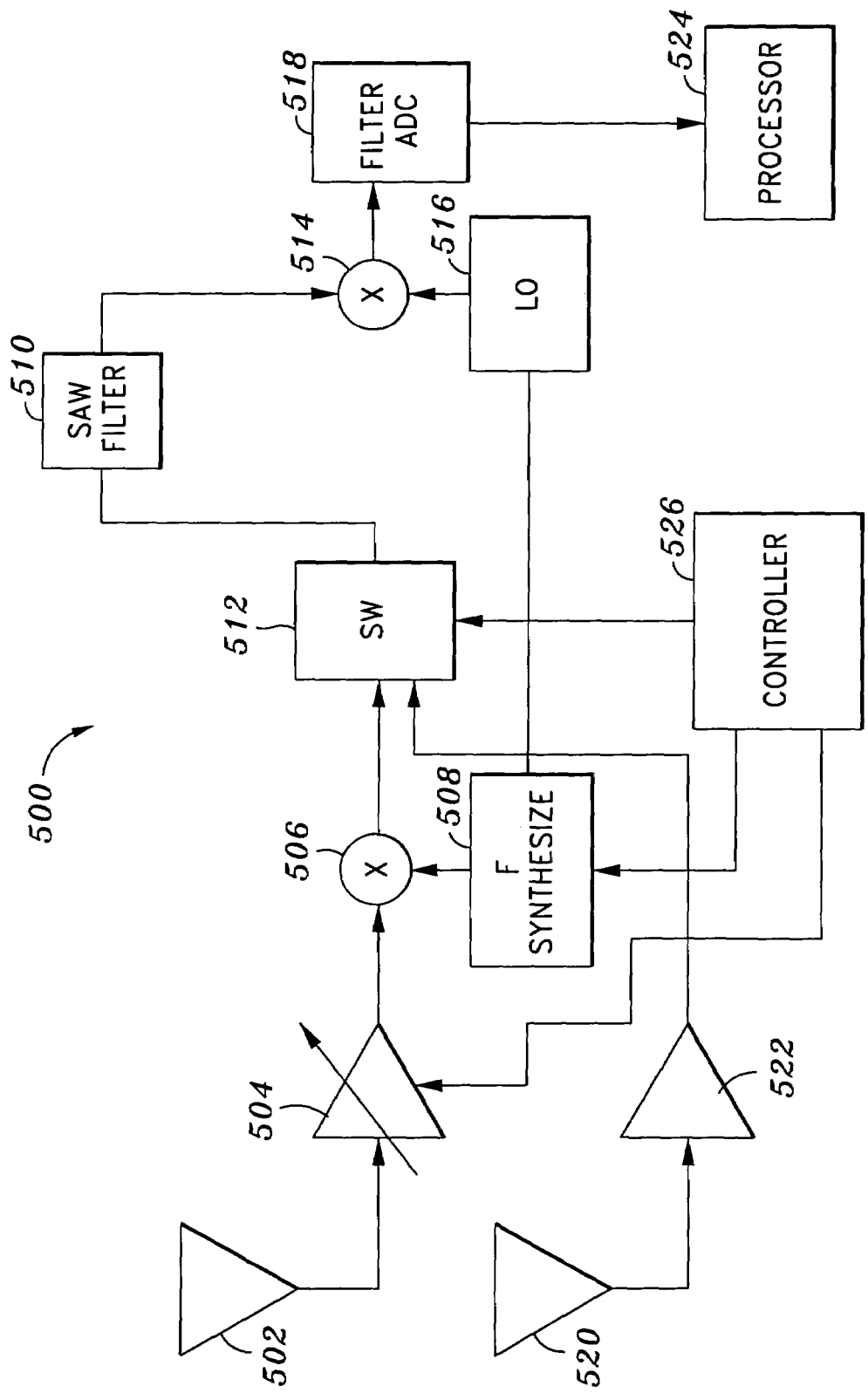
FIG. 5 shows a receiver capable of processing both television signals and GPS signals for position determination according to some implementations.

FIG. 5 shows a receiver 500 that may be implemented in a user terminal. The receiver is capable of processing both television signals and GPS signals for position determination according to some implementations. A TV antenna 502 receives the TV signals. In other implementations, the same antenna can be used for both the GPS and the TV signal. This antenna may be coupled to a tuning circuit (not shown) to form an antenna system in order to resonate at the different frequencies of the television signals or the GPS signals. Alternately, this antenna can have two feeds, one which outputs a signal in the GPS band and one which outputs a signal in the TV band, with a switch determining which feed outputs to the low noise amplifier (LNA) in the receiver front end. A low noise amplifier and RF filter 504 amplifies and filters the received TV signals. The RF filter is tunable over the required range for the set of TV channels that is selected. This could, for example, include the UHF channels in the range 450 MHz through 7 MHz. The low noise amplifier 504 includes an automatic gain control function. In one embodiment, a frequency converter includes a mixer 506, a local oscillator (not shown) and a frequency synthesizer 508. The mixer 506 combines the resulting signal with the output of a frequency synthesizer 508 to up-convert the signal to an IF frequency where a narrow bandwidth SAW filter 510 can be employed. In one embodiment, the local oscillator operates in conjunction with the frequency synthesizer 508. A switch 512 passes the TV signal to the SAW filter 510. In some embodiments, in order to make use of GPS the IF frequency is at or near to the GPS L1 frequency of 1575.42 MHz. Other implementations use the L2 frequency of 1227.6 MHz, which will shortly have a new civil signal, or the new L5 signal in the 1.1 GHz region. In still other implementations, a different IF frequency can be used and the GPS signal as well as the TV signal will initially be up-converted or down-converted prior to bandpass filtering.

In one embodiment, a frequency converter includes a mixer 514 and a local oscillator 516. The mixer 514 combines the filtered signal with the output of a local oscillator 516 to down-convert the filtered signal to a post-frequency converter signal at a convenient IF frequency. In another embodiment, the local oscillator 516 is driven by the frequency synthesizer 508. In one embodiment, the IF frequency is 44 MHz, a standard TV IF frequency. Filter/ADC 518 then filters and digitizes the signal. The signal can then be IF sampled at, for example, 27 Msps using a 10 bit ADC. The digitized signal is fed to a processor 524 for processing. A controller 526 controls filter/amplifier 504, frequency synthesizer 508, and switch 512.

Processor 524 includes, in one embodiment, a digital signal processor (DSP) for retiming and recovering the digitized received signal and using pertinent portions of the signal for time-offset and/or pseudo-range determination. In other embodiments, one or more general purpose microprocessors or ASICs may be used for this application. Exemplary algorithms and associated pseudo-code for execution in processor 524 is set forth below.

A GPS antenna 520, such as a patch antenna, receives the GPS signals. A low noise amplifier and RF filter 522 amplifies and filters the received GPS signals. Switch 512 passes the GPS signal to SAW filter 510. Mixer 514 combines the filtered signal with the output of a local oscillator 516 to down-convert the filtered signal to a convenient IF or baseband frequency. Filter/ADC 518 then filters and digitizes the signal. The signal can then be IF sampled at, for example, 27 Msps using a 10 bit ADC. GPS can be sampled at substantially lower sampling rates and with fewer bits without significantly affecting performance. The digitized signal is fed into a processing component 524 for digital processing. In accordance with the knowledge of one skilled in the art, it is clear that the processing component 524 may be a processor, a microprocessor, a DSP or may be implemented largely in hardware.

In one embodiment, the receiver front end comprises at least one low noise amplifier and RF filter 504, at least one mixer 506, a frequency synthesizer 508, at least one local oscillator 516, a filter 510, an Analog to Digital Converter (ADC) 518 and a controller 526. In some implementations, the entire RF section is fabricated as a single integrated circuit, with the possible exception of the SAW filter 510 (or similar high selectivity bandpass filter) and the processing component 524 which may be fabricated as one or more separate integrated circuits.

We will now explore some of the components of FIG. 5 in more detail. We begin with the digital processing section as represented by processor 524. In one embodiment of the invention, there is a second IF at a center frequency of 44 MHz, the signal is sampled at a rate of 27 MHz, and a coherent down-conversion architecture is used, where carrier acquisition is performed on the sampled signal. None of these assumptions are crucial to ideas discussed, as one skilled in the art will recognize.

Figure 6:
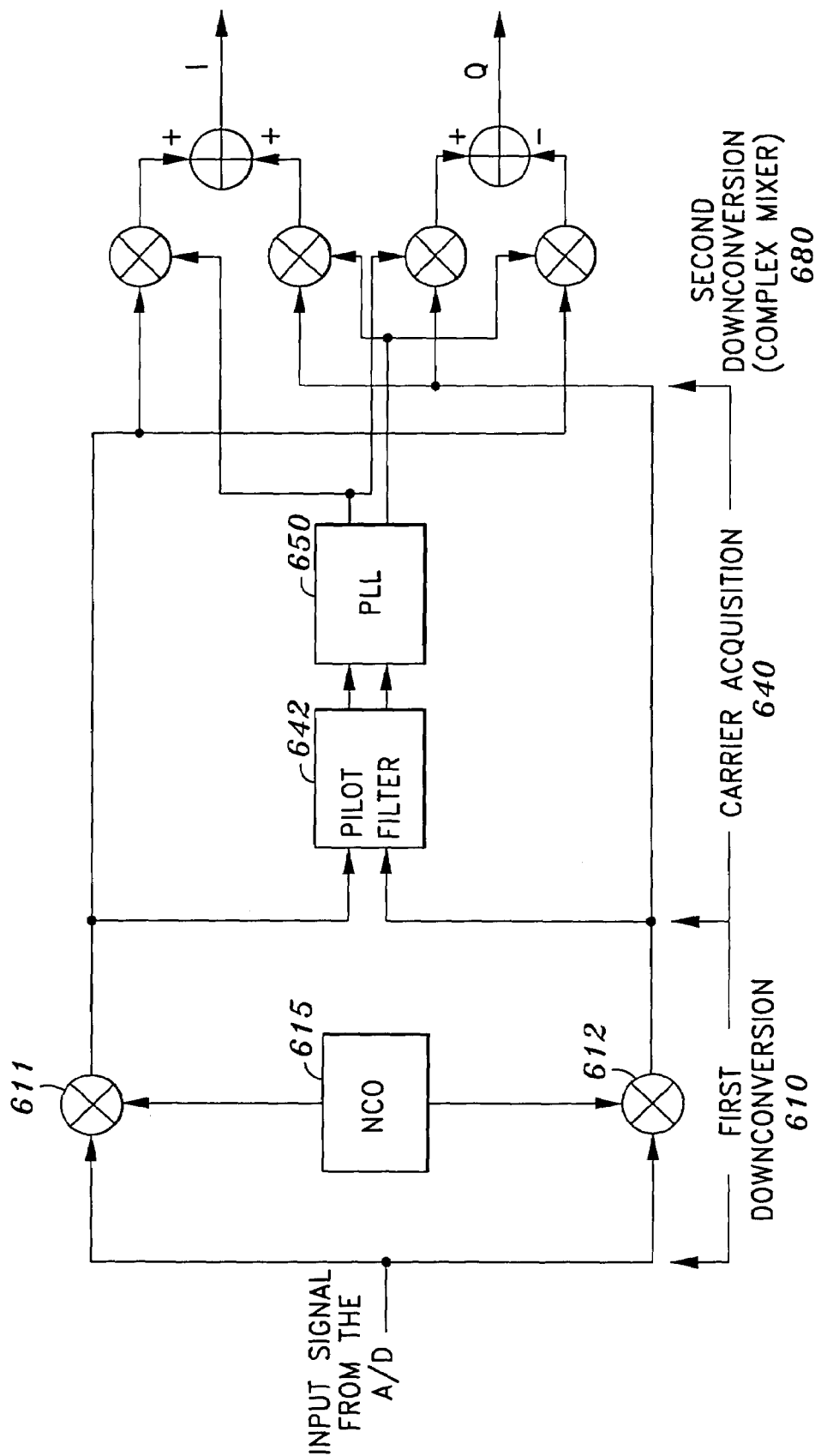
FIG. 6 shows an embodiment for performing a coherent digital downconversion.

FIG. 6 illustrates a coherent down-converter which, in one implementation, takes a real valued signal output from the ADC, and generates a complex valued baseband signal. As noted above, part or all of this implementation may be performed by a DSP or other processing-based device, or it may be performed by dedicated hardware intermediary to the processor and ADC. The second IF signal has a spectrum that lies between [41, 47] MHz, which after undersampling at 27 MHz by the A/D converter, gets translated to a [7, 13] MHz band. A reversal of the spectrum may also be performed to place the pilot signal at the lower end of the spectrum, in the vicinity of 7 MHz. Due to the large offsets of the pilot frequency between various analog and digital channels, the coherent downconverter typically needs frequency aiding, i.e. an external algorithm supplies an estimate of the pilot frequency, accurate enough for it to lie within the tracking range of the PLL. In one embodiment, this information on the frequency offset of each channel is measured at the monitor unit and passed to the mobile device. One method for estimating the pilot frequency may be found in copending U.S. patent application Ser. No. 10/945,878, "Pilot acquisition and local clock calibration with reduced MIPS," filed Sep. 22, 2004, which is incorporated by reference as if fully set forth herein.

In the embodiment of FIG. 6, the downconversion may be accomplished in two stages. The first stage (utilizing the first downconversion unit 610) includes mixing the real-valued input signal with quadrature outputs of a Numerically Controlled Oscillator (NCO), whose frequency is adjusted to lie 700 kHz below the estimated pilot frequency. The spectrum of the signal is translated such that the pilot signal lies at 700 kHz. The downconversion to 700 kHz prior to recovering the carrier enables us to design a single, fixed coefficient filter to extract the pilot signal. The pilot frequency output from the AID varies over a range of several hundred kHz as we tune through different channels. Accordingly, in this embodiment, it is necessary to reduce the pilot frequency to a fixed value by correctly setting the frequency of the first downconversion 610.

Figure 7:
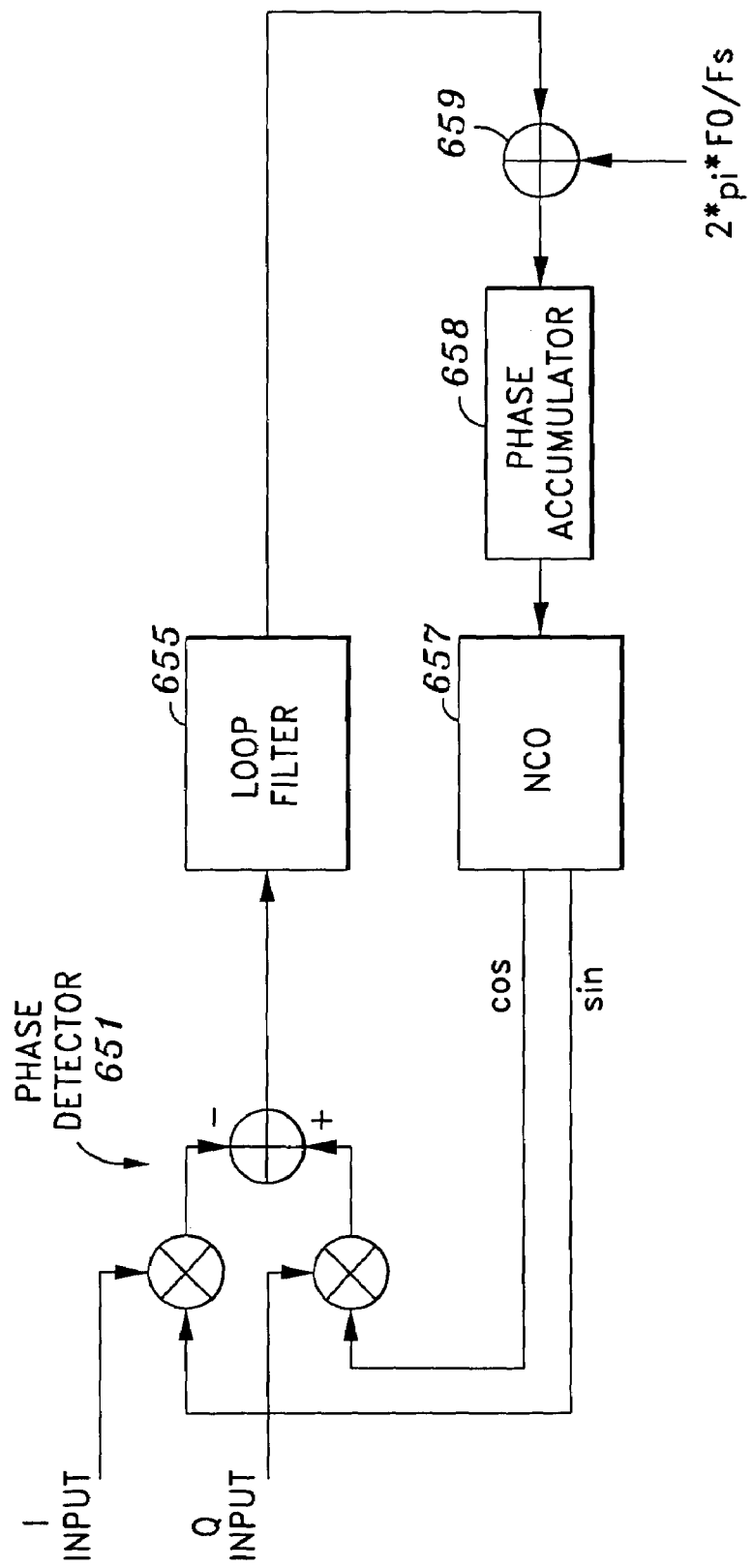
FIG. 7 shows an architecture for implementing a phase-locked loop to acquire the incident carrier signal.

After the first downconversion 610, the signal is branched into two paths—namely through the carrier acquisition unit 640 and second downconversion unit 680. Carrier acquisition unit 640 (a.k.a. carrier recovery) consists of a narrow bandpass filter 642 and a phase-locked loop (PLL) 650 which is illustrated in FIG. 7. The purpose of the PLL 650 in this embodiment is to reproduce the vestigial sideband (VSB) carrier with the help of the pilot signal present in the received signal. As seen in FIG. 7, the PLL 650 includes a phase detector 651, loop filter 655 and an NCO 657. The NCO 657 is programmed to generate a 700 kHz signal. The phase detector is simply a complex mixer which multiplies the I/Q outputs of the filtered Pilot signal with I/Q outputs of the NCO 657. The resulting signal is passed through a loop filter, which is implemented in one embodiment as a second order Infinite Impulse Response (IIR) Filter. The loop filter coefficients are designed to satisfy closed loop stability, the desired tracking range and acceptable phase noise of the NCO. The output of the loop filter 655 may then be scaled by a constant (device 659) and added via phase accumulator 658 to the phase word of the numerically controlled oscillator (NCO), which determines the rate of the NCO, and maintains lock in the filtered pilot signal.

The second downconversion unit 680 includes a complex mixer which mixes the I-Q outputs of the first stage of downconversion with the I-Q outputs of the PLL 650. The resulting signal is converted to baseband and, in this embodiment, has a spectrum in the range [0, 6] MHz.

Many alternative techniques exist to implementing the signal processing, which do not change the fundamental idea of the invention. We will not explore in detail the alternative techniques that can be used for processing the GPS signals, since these techniques are well understood in the art. We will focus instead on alternative methods and architectures for processing the TV signals. One alternative is to convert the TV signal output from the SAW filter 510 to baseband instead of to some IF frequency. This approach would typically make use of an in-phase and a quadrature mixer, instead of a single mixer 514. Some of the issues associated with the conversion of an analog signal to baseband will now be discussed in the context of the direct down-conversion architecture of FIG. 8.

Figure 8:
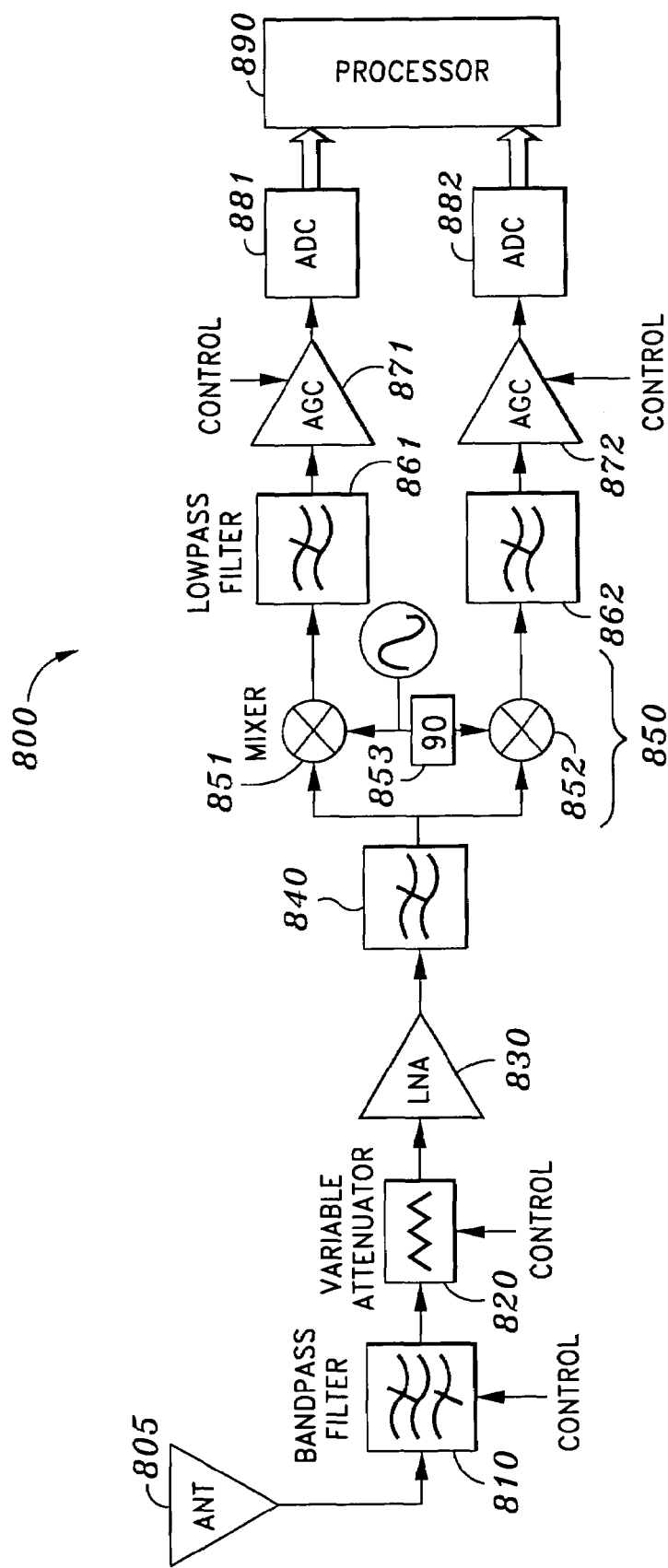
FIG. 8 shows a direct downconversion architecture for processing the TV signals.

The receiver architecture 800 shown in FIG. 8 is well-suited to integrating the TV receiver component into an Application Specific Integrated Circuit (ASIC), although a variety of configurations may be contemplated. The tunable bandpass filter 810 removes unwanted interference signals so that the Low Noise Amplifier (LNA) 830 is not saturated, and inter-modulation products do not disrupt system performance. The tunable bandpass filter 810 has an adjustable passband which can be adjusted to select an instantaneous desired frequency band. The attenuator 820 at the front end is designed to improve the dynamic range of the circuit, by attenuating signals when the mobile device is close to a TV transmitter and receiving a very powerful signal. The LNA 830 amplifies the signal. The signal is then passed to an I/Q downconverter 850 which includes mixers 851, 852, a 90° phase shifter 853 and a local oscillator 854. The mathematics associated with the downconversion is analyzed below. The output of the I/Q downconverter 850 is an I component of the signal and a Q component of the signal. The Local Oscillator (LO) 854 signal driving the mixers 851, 852 and the 90° phase shifter 853 converts the signal down to baseband, or a very low Intermediate Frequency (IF) so that it can be filtered with low-pass filters 861, 862 that can be implemented on an Integrated Circuit (IC). The Automatic Gain Control (AGC) 871, 872 adjusts the magnitude of the signal so as to make better use of the available bits of the Analog to Digital Converter (ADC) 881, 882. The outputs of the ADCs 881, 882 constitute digitized I components and digitized Q components. In this embodiment, the outputs of the ADC 881, 882 are inputs to a processing component 890. In accordance with the knowledge of one skilled in the art, it is clear that the processing component 890 may be a processor, a microprocessor, a DSP or may be implemented largely or completely in hardware.

The receiver architecture 800 being described here is atypical for two reasons: Firstly, it does not require the use of an off-chip Surface Accoustic Wave (SAW) SAW filter which most TV receivers employ. Secondly, the receiver is designed to receive only Ultra-High Frequency (UHF) DTV channels, so that the full tuning range can be covered by a single Voltage-Controlled Oscillator (VCO). Of course, additional direct down-conversion paths can be added to receive VHF signals as well as UHF.

While the direct downconversion architecture may be difficult to implement for a data reception receiver, it is more straightforward to use this architecture for a navigation receiver because so much processing gain is available in the digital signal processing of a navigation receiver.

Software Receiver

Once the signal is received and appropriately digitized using one of the examples discussed above, many different approaches exist for correlating the receiver with the downconverted signal and extracting timing information. One approach which considerably mitigates the effects of multipath interference is to use a software algorithm to sample an entire autocorrelation function, rather than to use only early and late samples as in a standard DLL (Delay-locked loop) implemented in hardware. For the purpose of this disclosure, software can refer not only to code run on a general purpose processor, but also to code, whether programmable or firmware, that may be run on special-purpose processors such as DSPs or programmable cores.

Multipath effects can be mitigated by selecting the earliest correlation peak, which generally corresponds to the most direct path of the signal received from the TV transmitter to the user device. In the case that position can be computed with a brief delay, a simple approach is to use a software receiver, which samples a sequence of the down-converted signal, and then processes the sample in firmware on a DSP. We will first describe the correlation processing in the context of a non-coherent software receiver which does not acquire an incident pilot signal.

A nominal offset frequency for the downconverted sampled signal is assumed. If the signal is downconverted to baseband as with the discussion above, the nominal offset is 0 Hz. The process generates the complete autocorrelation function, $R(\tau)$, based on sampled signal $s_{samp}(t)$. Let $T_s$ be the period of data sampled, $\omega_{in}$ be the nominal offset of the sampled incident signal, and let $\omega_{offset}$ be the largest possible offset frequency, due to Doppler shift and oscillator frequency drift. The process implements, in one embodiment, the pseudocode listed below.

$R_{max}=0$

Create a complex code signal $$s_{code}(t)=C_i(t)+jC_q(t)$$

where $C_i$ represents a function describing the in-phase baseband signal and $C_q$ is a function describing the quadrature baseband signal.

Compute $F(s_{code})^*$ where $F$ is the Fourier transform operator, and $*$ is the conjugate operator.

For $\omega = \omega_{in} - \omega_{offset}$ to $\omega_{in} + \omega_{offset}$ step $\Delta\omega = \dfrac{\pi}{2T_s}$ Create a complex mixing signal $$s_{mix}(t)=\cos(\omega t)+j\sin(\omega t)$$

Combine the incident signal s(t) and the mixing signal $s_{mix}(t)$ $$s_{comb}(t)=s_{samp}(t)s_{mix}(t)$$

Compute the correlation function $$R(\tau)=F^{-1}\{F(s_{code})^*F(s_{comb})\}$$

If $\max_\tau|R(\tau)|>R_{max}$, $R_{max}\leftarrow\max_\tau|R(\tau)|$, $R_{store}(\tau)=R(\tau)$ Next $\omega$ Upon exit from the process, $R_{store}(\tau)$ will store the correlation between the incident sampled signal $s_{samp}(t)$ and the complex code signal $s_{code}(t)$. $R_{store}(\tau)$ may be further refined by searching over smaller steps of $\omega$. The initial step size for $\omega$ must be less then half the Nyquist rate $$\dfrac{2\pi}{T_s}.$$

The time offset $\tau$ that produces the maximum correlation output is used as the pseudo-range. As one skilled in the art will recognize, the above pseudo-code can readily be translated into a generic or machine/circuit specific computer program or set of programs to perform the identified operations.

Thus, in one embodiment, a software receiver is employed which samples a sequence of the downconverted signal, and then processes the samples in firmware on a DSP, microprocessor, or similar processing circuit. A receiver implementation in accordance with an embodiment of the present invention will be described in the context of receiving and digitally processing an illustrative digital television signal. It should be understood, however, that the disclosed receiver has equal applicability to other types of television signals and standards, as discussed above. A digital television broadcast signal presents a suitable framework for describing an embodiment of the invention. Accordingly, certain characteristics of an exemplary digital signal are discussed below.

Digital Television Signal Characteristics

While the principles of the present invention are equally applicable to a wide variety of signal types as discussed in greater detail above, one illustrative embodiment uses information contained in a standard ATSC digital television signal to acquire synchronization codes and extract timing information. Accordingly, while the invention is not limited to such an embodiment, we present it here for illustrative purposes as a foundational example of the capabilities of the various aspects of the present invention.

The advancement of the state of the art presently allows the transmission of digital television (DTV) in the same six (6) MHz bandwidth currently used by NTSC. Generally, digital transmission provides superior video and audio reception. In one implementation involving the American Television Standard Committee (ATSC), digital television relies on a signaling technique known as vestigial sideband ("VSB"), which has been developed for terrestrial and cable television broadcasting in the United States. The digital VSB transmission system uses three supplementary signals for synchronization. First, a pilot signal having a relatively small amplitude is used for acquisition of the carrier signal. Second, a data segment sync sequence is employed for synchronizing the frequency and phase of the data clock at the receiver. Third, a data frame sync sequence is used for data framing and equalizer training. The present symbol rate of the ATSC signal is $f_s$=10.762237 MHz, which is derived from a 27.000000 MHz clock.

Figure 9:
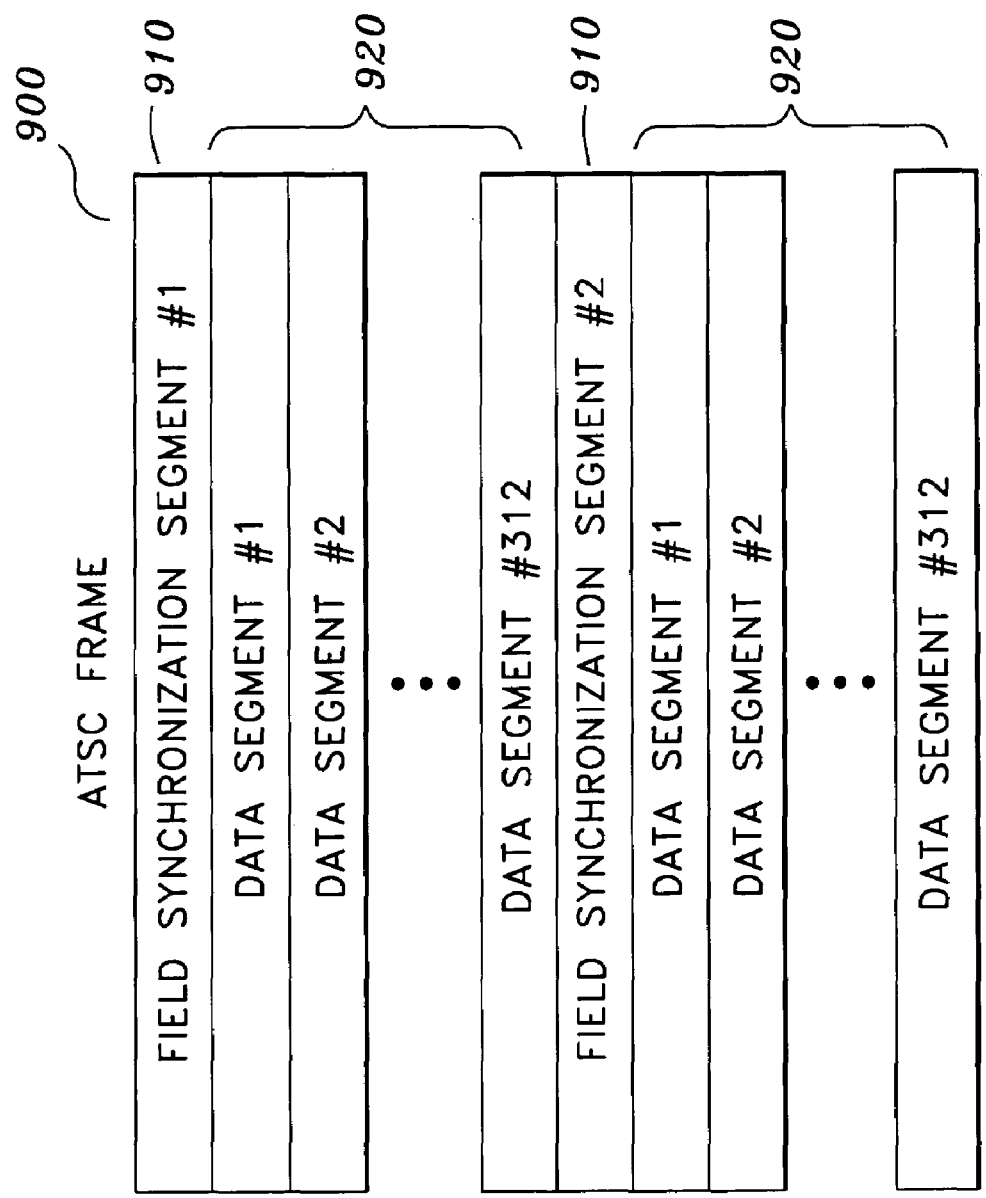
FIG. 9 shows an exemplary ATSC signal frame.
Figure 10A:
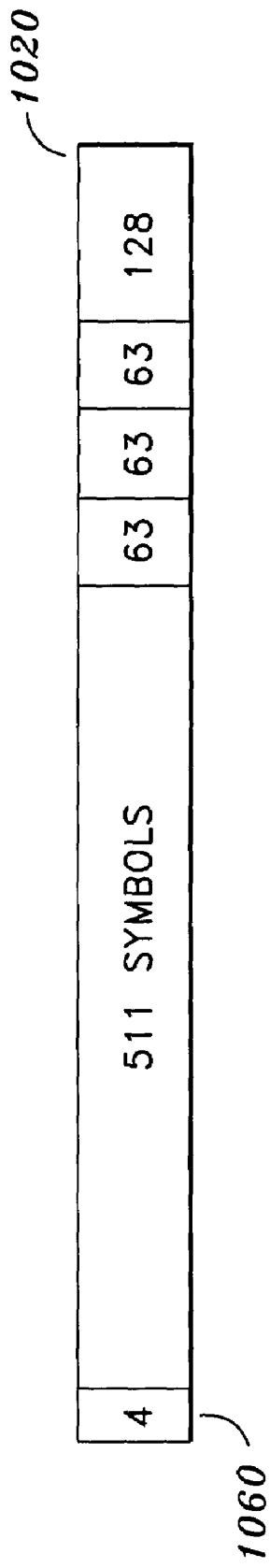
FIG. 10A shows a field synchronization segment of the ATSC signal frame from FIG. 9.
Figure 10B:
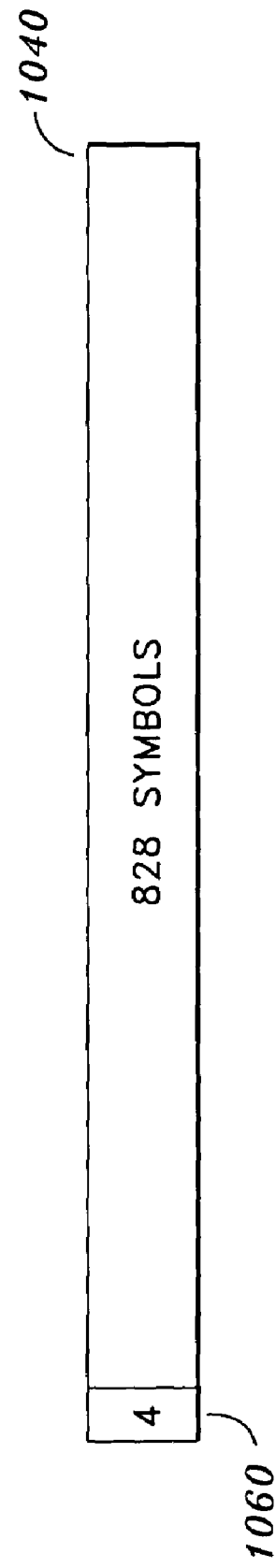
FIG 10B shows a data segment of the ATSC signal frame from FIG. 9.

A representation of an exemplary ATSC frame 900 is shown in FIG. 9. The ATSC frame 900 in this configuration includes a total of 626 segments (312×2 data segments +2 field synchronization segments), with each of two field synchronization segments 910 respectively followed by 312 data segments 920. A field synchronization segment 1020 is shown in FIG. 10A. The field synchronization segment 1020 is used to indicate the commencement of a series of 312 ensuing data segments. An exemplary data segment 1040 is shown in FIG. 10B. Each data segment 1040 and field synchronization segment 1020 begins with a four-symbol synchronization code 1060. As will be seen, for the ATSC DTV 8-VSB standard, it is this synchronization code 1060 upon which the software uses in one embodiment to establish a correlation peak for the purposes of extracting timing information for position location.

Figure 11:
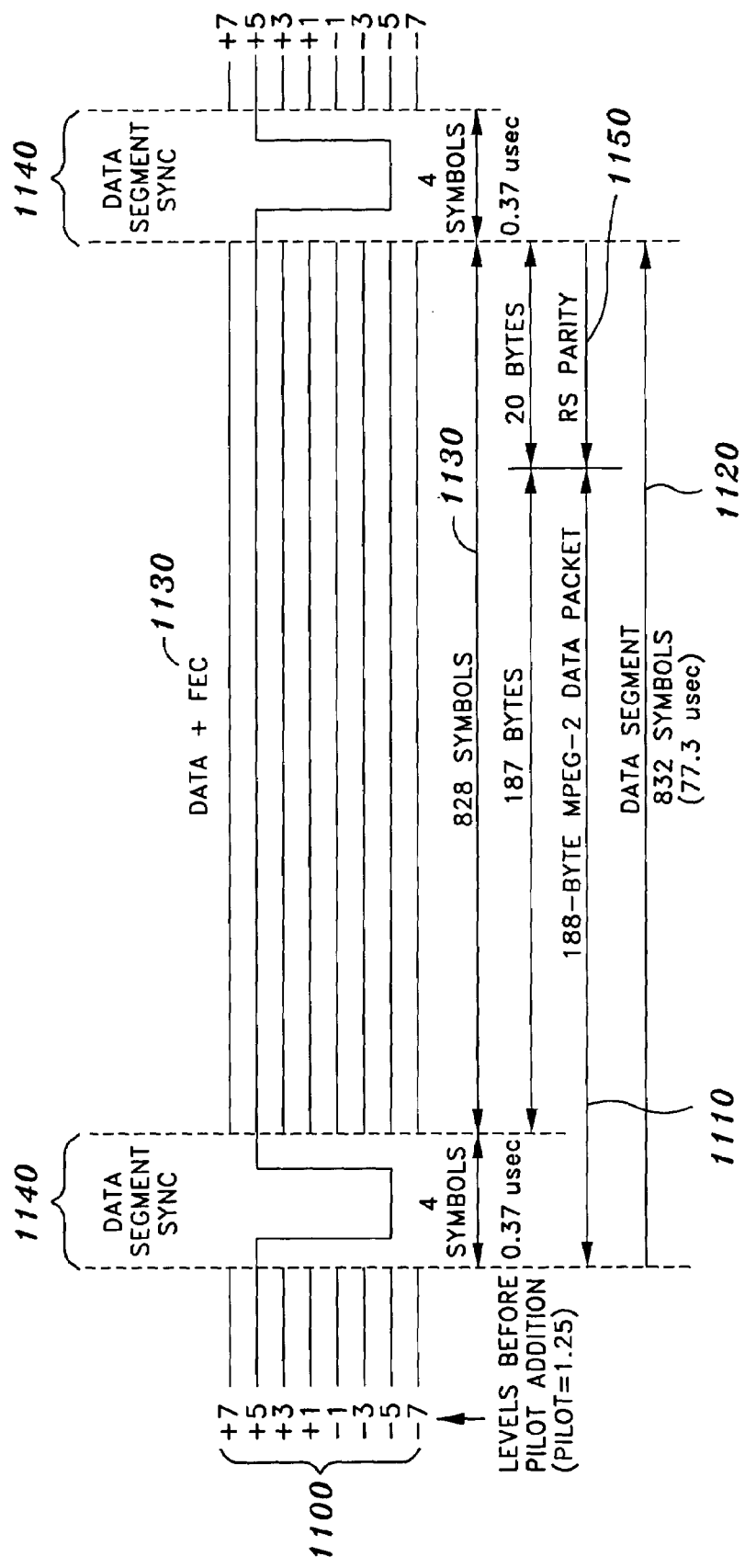
FIG. 11 shows an ATSC digital television signal in a coded 8-VSB baseband data segment format.

FIG. 11 shows an exemplary format of an 8-VSB signal used in digital television transmissions. The frame in the implementation shown is in coded 8-VSB baseband data signal format. For clarity, the horizontal direction of the figure represents time, and the vertical direction represents amplitude or relative signal power. For the purposes of this disclosure, it should be noted that different digital and analog formats exist and can be implemented without departing from the spirit or scope of the present invention. In the 8-VSB signal format shown in FIG. 11, eight discrete data levels 1100 (−7, −5, −3, −1, +1, +3, +5, +7) 1100 are present. Because the modulation scheme is 8-ary VSB in this configuration, each symbol carries 3 bits of coded data, thereby accounting for the eight data levels per symbol. These levels are shown prior to the addition of the low-level pilot signal. Generally, in the digital transmission system, various other modes may be used in lieu of the depicted format, including VSB modes (e.g., 2, 4, 8, 8-trellis, 16, etc.). The total data rate of the transmitted signal typically depends upon the number of discrete signal levels, whether which coding is used, and other criteria. Presently, 19.3 Mbit/second coded 8-VSB has been selected for terrestrial DTV broadcasting, while 38.6 Mbit/sec 16-VSB has been selected for carrying two 19.3 Mbit/sec terrestrial digital broadcast signals in one 6 MHz channel on cable systems. The specific characteristics of the signal may vary without departing from the scope of the invention.

As noted above, the data signal in FIG. 9 is divided into equal length packets 920 called segments. The segment is compatible with the 188-byte MPEG-2 data packet standard (1110) (FIG. 11). Each segment includes 832 symbols of total time duration 77.3 μS, as shown by 1120 in FIG. 11. Of these 832 symbols, 828 symbols (1130) may be used for data transmission and error recovery. The remaining 4-symbols in this modulation scheme constitute a binary data segment synchronizing signal 1140 referred to herein as SYNC, or more simply the synchronization code for the illustrated digital television signal. In addition, twenty Reed-Solomon (RS) parity bytes (1150) for every data packet add redundancy in this implementation for forward error correction (FEC). Each frame includes a total of 626 segments, each segment containing 832 symbols for a total of 520,832 symbols per frame. Because the modulation scheme is 8-ary VSB in this configuration, each symbol carries 3 bits of coded data as noted above.

An in-phase pilot signal is generated in this modulation scheme by adding a DC value to the baseband signal. The pilot signal is at a constant RF level, at about 11.3 to 12 dB below the 8-VSB data modulated signal components. The pilot signal in this implementation aids in coherent demodulation independent of data, reduces receiver implementation loss, and provides reliable carrier recovery down to very low signal-to-noise ratios. Following modulation of the baseband signal with a high frequency carrier, the pilot signal exists as an in-phase signal.

The in-phase pulse of the 8-VSB signal, constructed by filtering, has a raised-cosine characteristic. To create a VSB signal from the in-phase pulse, the signal is filtered so that only a small portion of the lower sideband remains.

The four-symbol binary SYNC 1140 in this embodiment is repetitive, fixed, and binary. In light of the random nature of the data, the repetitive SYNC signal 1140 may be readily identified. The SYNC signal 1140 may be used to assist in recovery of the clock signal and to allow for correct identification and synchronization of a data segment 1120. The repetitive nature of the SYNC allows receivers to determine the location of the segment intervals in the received signal and, as will be seen, enables the receiver to determine user location based on correlation methods.

Ideal Receiver Operation

For the purposes of understanding the elements of the various embodiments herein, the ideal operation of a mobile receiver is first described and certain key operations are discussed. Thereafter, a description of the basic operations of various embodiments of the mobile receiver is presented. While the discussion below contemplates the use and reception of an ATSC-based digital television signal, it will be appreciated that different types of television broadcast signals may be used without departing from the scope of the invention. In certain embodiments, as will be seen, the receiver rearranges the order of the basic operations and provides for superior software approaches using coherent accumulation of phase-corrected signal segments.

In certain embodiments, the signal is received, filtered, amplified and digitized by analog front end circuitry, where it is then passed to a processor (such as a microprocessor or DSP) where specific code is executed and operations are performed on the digitized data. Below, various such methods are presented.

The ideal ATSC digital TV signal at the mobile receiver has the following form:

$$S(t)=[(d(t)+A)+jd^*(t)]e^{j\omega_p t + \phi}$$

where d(t) represents the amplitude data signal on the inphase arm, and d*(t) represents the Hilbert Transform of d(t) on the quadrature arm relative to the pilot frequency $\omega_p$. Here we use $j=\sqrt{-1}$ a as the complex number in these equations.

The three key parameters in the ideal received signal S(t) are the pilot frequency $\omega_p$, the carrier phase $\phi$, and the signal frame times. In practical operation, these parameters are unknown and may be estimated at the mobile receiver. The receiver as disclosed herein may accurately estimate these frame times embedded in the received signal, which then may translate to pseudo-range measurements for purposes of determining position of the mobile receiver in conjunction with other signal measurements (e.g., from GPS transmitters or other television broadcast stations). In addition, a low-level pilot signal having amplitude A is employed for carrier acquisition as noted above.

For the purposes of assessing ideal receiver operation, it is assumed here that the above-described digital TV signal is received without distortion due to noise, Doppler shifts, or multipath interference in the communication channel from the TV transmitter to the mobile receiver.

Down-Coversion to Baseband

For ideal operations, the receiver may be assumed to have a perfect estimate of the pilot frequency $\omega_p$. Various methods may be used in practice to determine the pilot frequency at the receiver, such as those disclosed in copending U.S. patent application Ser. No. 10/945,878, "Pilot acquisition and local clock calibration with reduced MIPS," filed Sep. 22, 2004, by the same inventors and incorporated by reference herein. With the assumption of a perfect estimate in ideal operation, the received broadband signal may be down-converted to its corresponding baseband signal D(t) using the relationship:

$$D(t) = S(t)e^{-j\omega_p t} = [(d(t) + A) + jd^*(t)]e^{j\phi}$$

In cases where this procedure is performed in hardware on the receiver, a conventional multiplier or mixer circuit may be used to perform the down-conversion step.

Next the following trigonometric property is employed:

$$e^{j\phi} = \cos\phi + j\sin\phi \quad (9)$$

Using the above relationship (9), D(t) can now be represented as follows:

$$D(t) = [(d(t) + A) + jd^*(t)][\cos\phi + j\sin\phi] \quad (10a)$$

$$= (d(t) + A)\cos\phi + j(d(t) + A)\sin\phi + jd^*(t)\cos\phi - d^*(t)\sin\phi \quad (10b)$$

Using equations (10a) and (10b) above, the real and imaginary components, $s_i(t)$ and $s_q(t)$ respectively, of the complex baseband signal D(t) are determined to be $$Re\{D(t)\} = s_i(t) = (d(t)+A)\cos\phi - d^*(t)\sin\phi \quad (11)$$

and $$Im\{D(t)\} = s_q(t) = (d(t)+A)\sin\phi + d^*(t)\cos\phi \quad (12)$$

These equations establish that multiplying the broadband signal S(t) by the ideal $e^{-j\omega_p t}$ produces these two ideal forms of the received baseband inphase signal $s_i(t)$ and quadrature signal $s_q(t)$ relative to the pilot carrier frequency.

Correlation with Segment Sync Bits

As discussed above in connection with FIGS. 9 and 11, an ATSC signal may be divided into equal length MPEG-2 packets called segments, where each segment includes 832 symbols of total time duration T=77.3 μS. Each such segment begins with four fixed, binary symbols for segment synchronization. Accordingly, during every T=77.3 μS interval there exist four known segment bits. The data segment synchronization code (SYNC) may be used for synchronizing the data clock in both frequency and phase. In addition, using correlation methods, a mobile receiver may accurately estimate the time of arrival of these segment sync bits. Once this time-of-arrival information is calculated, the receiver can ultimately estimate (or provide the necessary information for a location server or other device to estimate) its position relative to the broadcasting transmission system. Accordingly, a description of an exemplary correlation method using the data segment SYNC according to one embodiment is set forth below.

In this example, h(t) represents the ideal four-bit segment SYNC for the time interval [0, $T_0$] where $$T_0 = \frac{4T}{832} = 0.37 \; \mu S$$

Consequently, in the first segment time interval [0, T] using an ATSC standard digital television signal, the data signal d(t) has the following form:

$$d(t) = h(t-\tau) \text{ for } \tau \leq t \leq \tau + T_0$$

where the quantity τ represents the unknown beginning time of the occurrence of the segment sync bits in this first segment interval of the received signal. Stated differently, for values of t between τ and τ+$T_0$ only, the data signal d(t) is equal to the segment sync function h(t) delayed by τ (namely h(t−τ)). It will be appreciated that determination of this value τ using correlation methods enables a receiver to determine pseudo-ranges from transmitting broadcast antennas, and ultimately for facilitating the calculation of position location.

It should be noted that the quantity r represents a time delay relative to a time reference (e.g., $t'_u$) perceived by the receiving station, rather than the "true time" of the signal (e.g., $t_u$) actually transmitted from the broadcasting station. This distinction arises from the fact that the user device invariably does not have a perfectly synchronized clock. (Likewise, the transmitter has an imperfect clock and does not have precise knowledge of true time.) The user's clock is consequently offset from the true time by some time offset. The pseudo-range measurement computed by the receiving device constitutes the time from the start of sampling by the receiver to the instant when the burst of the synchronization code arrives at the receiver multiplied by the speed of light. A number of conventional mathematical techniques may be used for taking the relative imperfections of the transmitter and receiver clocks into consideration and calculating positioning information based on these considerations. Certain of these techniques are discussed above in connection with FIG. 1.

To estimate the quantity τ, correlation methods may be used. In general, the correlation of a signal a(t) with a reference waveform b(t) may be defined as $$C_{ab}(t) = \int_{-\infty}^{\infty} a(\alpha)b(\alpha-t)d\alpha \quad (13)$$

Using equation (13), the mobile receiver may compute the following complex correlation function:

$$C(t;1) = \int_0^T D(\alpha)h(\alpha-t)d\alpha \quad (14)$$

Equation (14) represents the correlation of the complex baseband signal D(t) with the previously-defined reference waveform h(t). The numeral 1 on the left hand side of the equation signifies that, for this example, the first segment interval of the received signal is being correlated with reference waveform h(t). From equation (14), it is evident that a mathematical correlation can be conceptually viewed as a measure of the similarity between two signals. The real and imaginary components of equation (14) may be computed:

$$Re\{C(t;1)\} = \int_0^T s_i(\alpha)h(\alpha-t)d\alpha \quad (15)$$

and $$Im\{C(t;1)\} = \int_0^T s_q(\alpha)h(\alpha-t)d\alpha \quad (16)$$

Inserting the value of $s_i(t)$ from equation (11) into equation (15) and ignoring certain terms of relatively negligible magnitude when compared to the data portion of the signal (e.g., A→0), the real component of equation (14) becomes $$Re\{C(t;1)\} = \int_0^T [d(\alpha)\cos\phi - d^*(\alpha)\sin\phi]h(\alpha-t)d\alpha \quad (17)$$

$$= \int_0^T d(\alpha)h(\alpha-t)\cos\phi \, d\alpha -$$

$$\int_0^T d^*(\alpha)\sin\phi h(\alpha-t)d\alpha$$

Similarly, inserting the value of $s_q(t)$ from equation (12) into equation (16) and making the same assumptions as were made with respect to equation (15), the imaginary component of equation (14) becomes $$\text{Im}\{C(t;1)\} = \int_0^T [d(\alpha)\sin\phi + d^*(t)\cos\phi]h(\alpha - t)\,d\alpha \qquad (18)$$
$$= \int_0^T d(\alpha)\sin\phi h(\alpha - t)\,d\alpha +$$
$$\int_0^T d^*(t)\cos\phi h(\alpha - t)\,d\alpha$$

For the next step in computing the correlation values in equations (17) and (18), it should be recognized that when t is in the interval $[\tau-T_0, \tau+T_0]$, then $d(\alpha)=h(\alpha)$ $d^*(\alpha)=h^*(\alpha)$ Substituting $d(\alpha)$ for $h(\alpha)$ and $d^*(\alpha)$ for $h^*(\alpha)$ into equation (17) yields $$Re\{C(t;1)\} = \int_0^T h(\alpha)h(\alpha-t)\cos\phi\,d\alpha - \int_0^T h^*(\alpha)h(\alpha-t)\sin\phi\,d\alpha \qquad (19)$$

Making the same substitutions into equation (18) yields $$Im\{C(t;1)\} = \int_0^T h(\alpha)h(\alpha-t)\sin\phi\,d\alpha + \int_0^T h^*(\alpha)h(\alpha-t)\cos\phi\,d\alpha \qquad (20)$$

The first component on the right side of equation (19) is the correlation of the waveform h(t) with a time-delayed version of itself, also known as the autocorrelation of a waveform. The second component on the right side of equation (19) represents the correlation of the Hilbert transform h*(t) with a time-delayed version of h(t). Both autocorrelations are multiplied by a trigonometric representation of the phase angle $\phi$.

To further simplify equations (19) and (20), the following notations can be used:

$$C_{aa}(t) = \int_\infty^\infty h(\alpha)h(\alpha-t)\,d\alpha \qquad (21)$$

and $$C_{a^*a}(t) = \int_\infty^\infty h^*(\alpha)h(\alpha-t)\,d\alpha \qquad (22)$$

Using the notations in equations (21) and (22), and observing the mathematical property that $C_{a^*a}(t)=C^*_{aa}(t)$, the inphase and quadrature correlation outputs in equations (19) and (20) can now be represented for $t=t-\tau$ as follows:

$$Re\{C(t;1)\} = R_{hh}(t-\tau)\cos\phi - R^*_{hh}(t-\tau)\sin\phi \qquad (23)$$

and $$Im\{C(t;1)\} = R_{hh}(t-\tau)\sin\phi + R^*_{hh}(t-\tau)\cos\phi \qquad (24)$$

Accordingly, as is evident from equations (23) and (24), the beginning time T of the occurrence of the segment sync bits can be determined through autocorrelations of the segment sync function h(t) (and its Hilbert transform), multiplied by various trigonometric representations of the television phase angle $\phi$.

Coherent Accumulation of Correlation

In the previous section the correlation outputs for the inphase and quadrature phase outputs of an ideal digital television signal were computed for time 0 through time T. In this embodiment, the correlation method is extended to include the computation of correlation outputs for a TV signal received over N segment times with the total time interval [0, NT]. In such an implementation, the received signal may be viewed as N separate received signal waveforms, where each such waveform is defined over the same time interval [0,T]. The accumulation of N complex signals can be represented as S(t+nT) for $0 \leq t \leq T$ for n=0, 1, 2 . . . , N−1. Each of these signals covers one segment time interval and consequently includes the segment sync bits in the same unknown location in the time interval [0, T].

One objective of coherent accumulation in this implementation is to improve the mobile receiver's ability to estimate the commencement of segment syncs in the received signal. Coherent accumulation is particularly useful given the normally noisy channels and non-ideal conditions over which digital signals traverse. The accumulated inphase and quadrature correlator outputs form the basis for estimating pseudo-ranges and ultimately, the position of the mobile receiver.

Given the assumptions above, the resulting accumulated complex correlation can be represented in one implementation as follows:

$$C(t;N) = \sum_{n=0}^{N-1} \int_0^T D(\alpha + nT)h(\alpha - t)\,d\alpha \qquad (25)$$

Substituting the television signal representation S(t+nT) for the data signal in equation (14) and down-converting the signal to baseband format yields the following alternative representation of the accumulated complex correlation:

$$C(t;N) = \sum_{n=0}^{N-1} \int_0^T S(\alpha + nT)e^{-j\omega_P(\alpha+nT)}h(\alpha - t)\,d\alpha \qquad (26)$$

Equation (26) is useful for estimating the leading edge components of the digital television signal. The accumulated correlation computed in equation (26) does not, however, presume the existence of multipath components. In normal environments, multipath components exist at the receiver that may have an arbitrary phase relative to one another. Accordingly, in certain embodiments, the mobile receiver takes multipath components into account by cross-correlating both the inphase and quadrature baseband signals with the same reference waveform h(t). (An illustration of this cross-correlation is set forth subsequently in this disclosure.) Multipath interference can be accounted for by selecting the earliest and largest correlation peak. The general complex correlation output in equation (26) may be used to estimate the leading edge multipath component of the received digital television signal.

Changing Order of Operations

In one embodiment of the present invention, the order of operations leading to the computation of the complex correlation output C(t;N) may be modified. Changing the order of operations has numerous advantages, including, for example, significantly reducing the computational requirements of the mobile receiver while quickly and effectively facilitating an accurate determination of position location. In certain embodiments, as a result of changing the order of operations at the mobile receiver, principal portions of the receiver functionality may be implemented in software or firmware. In those embodiments, the computational requirements and hence the corresponding burden on the processor(s) and memory may be dramatically reduced. These advantages, while universally applicable, are particularly useful for sustaining high position determination performance in mobile devices having limited computational power and memory capacity.

In another embodiment, a method and apparatus for coherent accumulation of IF (Intermediate Frequency) signal segments is disclosed. Using the disclosed method and apparatus may permit a software implementation of the mobile receiver to perform positioning determination computations in real time.

Figure 12:
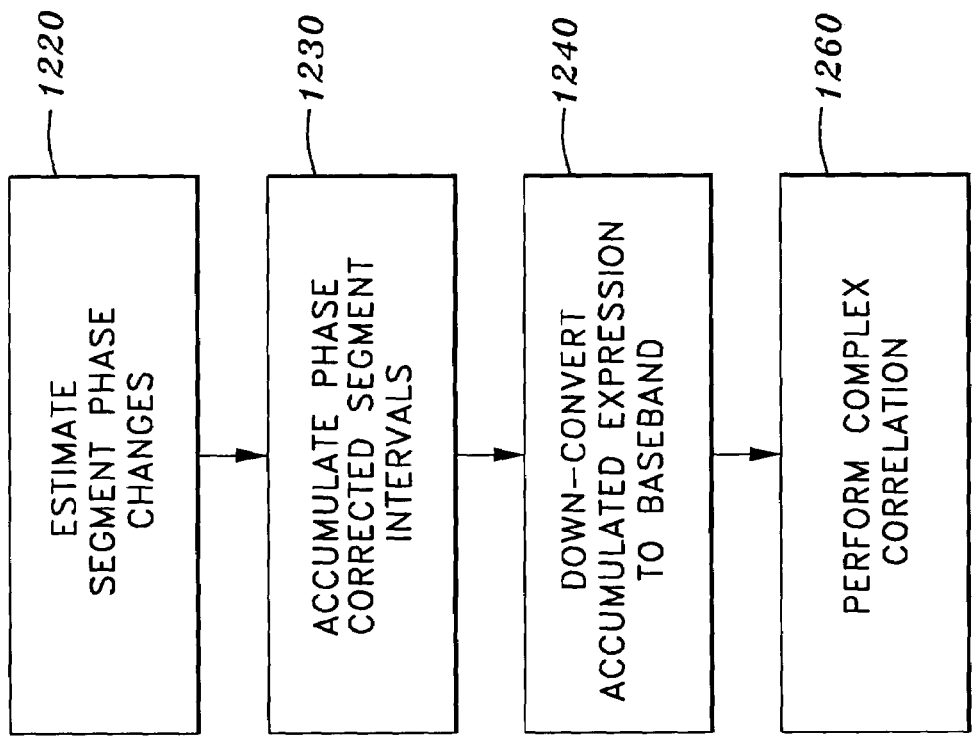
FIG. 12 is a block diagram of an algorithm for estimating correlation peaks associated with pseudo-range estimation in accordance with an embodiment of the present invention.

In certain embodiments, the order of operations for receiving terrestrial broadcasts and calculating pseudo-ranges for receiver position location is altered as noted above to encompass the following steps:
 (i) Estimation of Segment Phase Change
 (ii) Accumulation of Segment Intervals
 (iii) Down-Conversion to Baseband
 (iv) Complex Correlation These steps are detailed below in the context of an exemplary configuration of the mobile receiver. The steps may be performed in software or firmware by a processing unit such as a microprocessor, DSP, or the like. FIG. 12 shows a flow diagram of an algorithm for computing pseudo-ranges in accordance with an embodiment of the invention. The steps listed above, among other advantages, can cut considerable computational overhead ordinarily associated with the correlation process by performing, in some embodiments, a complex correlation over an accumulated set of phase-adjusted signal intervals, in contrast to the requirement of correlating each independent segment interval with the reference waveform, the latter approach of which can inject considerable computation complexity into the process for determining $\tau$ for a given television waveform.

1. Estimation of Segment Phase Change

Generally, in non-ideal operations, the mobile receiver may not have exact knowledge of the pilot carrier frequency. Instead, in one embodiment, the receiver maintains a local estimate given by $\omega$. The receiver also may have no a priori knowledge of the phase term $\phi$ in each received segment. Referring to FIG. 12, the phase may be estimated at the receiver by estimating the phase terms $\phi_n$ for each of the N segment intervals referenced above, where n=0, 1, 2, ..., N−1 (step 1220). Further, as illustrated in greater detail below, each of these estimates at the receiver may be offset by the same constant without causing degradation during the calculations of the coherent accumulation. In particular, while a fixed phase offset for all segments may change the phase relationship of the final accumulated inphase and quadrature phase terms, the offset does not impact the coherent accumulation computation itself.

In one embodiment, in the nth interval of T seconds the unknown received phase term $\phi_n$ can be calculated as follows:

$$e^{j\phi_n} = \frac{\int_0^T S(t+nT)e^{-j\omega(t+nT)}dt}{\left|\int_0^T S(t+nT)e^{-j\omega(t+nT)}dt\right|} \quad (20)$$

Equation (20) is accurate to the degree that the signal terms satisfy the following equations (21) and (22) below, relative to the pilot term $$\int_0^T A\,dt = AT.$$

$$\int_0^T d(t+nT)dt \approx 0 \quad (21)$$

$$\int_0^T d^*(t+nT)dt \approx 0 \quad (22)$$

Equations (21) and (22) may be considered reliable estimates in part because the baseband data in a digital television signal has zero mean, given that all of the data levels (e.g., 2, 4, 8, 16) are equiprobable. Thus, equation (20) may be used in this instance as a reasonable approximation of the segment phase changes for each value of n.

In addition, the phase estimates for each segment interval (equation (20)) may be robust and relatively insensitive to the actual proximity of the receiver's estimated pilot frequency $\omega$ to the true pilot frequency $\omega_p$. As an illustration of this insensitivity, assume that only the pilot signal is received so that $S(t)=Ae^{j\omega_p t+\phi}$. Using this assumption, down-converting the signal to baseband using the receiver's local pilot frequency estimate $\omega$, and integrating the expression over the first segment interval produces the following expression:

$$\int_0^T S(t)e^{-j\omega t}dt = \int_0^T Ae^{j\omega_p t+\phi}e^{-j\omega t}dt = (A\int_0^T e^{j(\omega_p-\omega)t}dt)e^{j\phi} \quad (23)$$

The right hand side of equation (23) represents a complex constant multiplied by the phase term $e^{j\phi}$. This expression may be considered, for illustrative purposes, a phase estimation "signal-to-noise ratio." Equation (23) can also be observed that as long as the parameters in the complex expression $E=A\int_0^T e^{j(\omega_p-\omega)t}dt$ remain relatively constant for each of the segment intervals, this expression results in a constant phase shift in the final accumulation of the IF signal segments. Stated differently, this phase estimation is relatively insensitive to small differences in $\omega_p-\omega$. Accordingly, equation (20) may be used with reasonable precision to compute changes in signal phase for each interval and the relatively constant phase offset will not affect the overall coherent accumulation calculation. An appropriate software-executable instruction or instructions can enable the determination of phase offset as governed by equation (20).

An assumption can also be made with reasonable accuracy that the phase term $\phi$ as estimated in equation (20) changes relatively slowly in each segment. It follows that the complex term E set forth above may be assumed to represent the same constant in each segment interval. As such, in this embodiment, only the pilot tone phases need to be estimated in each segment interval.

The pilot signal may in many embodiments be approximately 12 dB below the data modulated signal. However, integrating over the 832 symbols of any T second segment interval in this configuration produces an integrated pilot term that is approximately 18 dB larger than the T second averaged signal terms.

In light of the above conclusions, and given any T second segment interval, the mobile receiver may obtain a phase estimate by integrating the inphase and quadrature baseband signals. A more general estimate of the phase may be provided by the following smoothing filter expression:

$$\hat{\phi}_n = \rho\phi_n + (1-\rho)\hat{\phi}_{n-1} \quad (24)$$

where $\phi_n$ is given above for n=0, 1, 2, ..., N−1 with $\hat{\phi}_0=\phi_0$, and $\rho$ represents a weighting parameter dependent upon the rate of change of the phase. There are many other means of estimating the phase changes that can be applied.

In other implementations, the carrier phase of an ATSC television signal may be estimated by using a matched input filter having a designated transfer function and applying the input of the signal to produce the desired output signal.

$$\text{Let } s(t)=m_i(t)\cos(\omega_p t+\phi)+m_q(t)\sin(\omega_p t+\phi) \quad (24a)$$

where the inphase and quadrature phase components are represented as $$m_i(t)=A+h(t)+r(t) \text{ and} \quad (24b)$$

$$m_q(t)=h^*(t)+r^*(t). \quad (24c)$$

Figure 13:
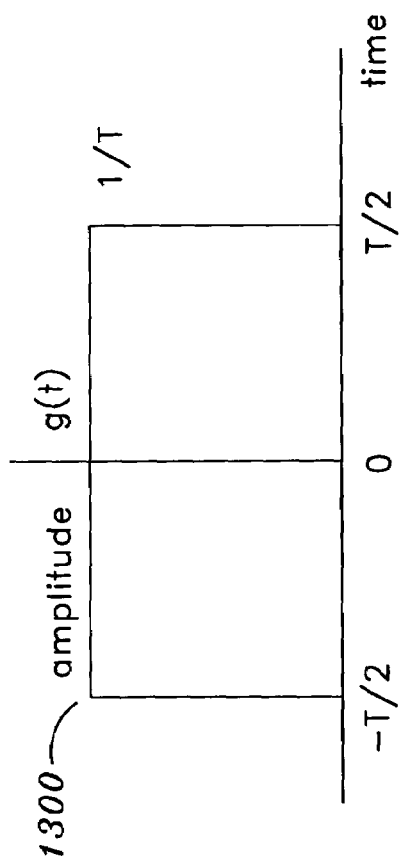
FIG. 13 is a portion of a transfer function of an impulse response filter in accordance with an embodiment of the present invention.
Figure 14:
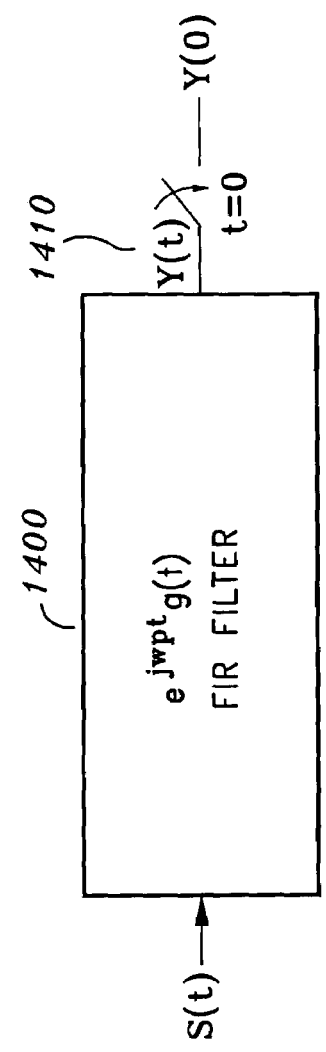
FIG. 14 is a Finite Impulse Response (FIR) filter in accordance with an embodiment of the present invention.

Here, h(t) represents the modulating signal attributable to the 4-symbol segment synchronization signal, and r(t) represents the modulating signal attributable to the data symbols (828 per segment). As before, the quantity A represents the pilot tone amplitude, and h*(t) and r*(t) represent the Hilbert transforms of h(t) and r(t), respectively. The carrier phase at time t=0 can be estimated as follows. Let g(t) represent a rectangular pulse 1300 as shown in FIG. 13. The pulse g(t) has a duration of T seconds and an amplitude of 1/T, and is centered at t=0. Thus, the pulse g(t) extends from −T/2 to T/2 seconds. Here, T is the period of the segment synchronization signal. Next, a Finite Impulse Response (FIR) filter 1400 may be used, as shown in FIG. 14. The impulse response of the filter 1400 is set to $e^{j\omega_p t}g(t)$. The user device may filter the television signal s(t) using the FIR filter 1400, and the output y(t) of the filter is sampled at t=0 to produce Y(0), as illustrated by switch 1410. As demonstrated below, the estimated value of φ using this technique represents the angle formed by the complex value Y(0): namely, $Y(0)=|Y(0)|e^{j\Phi}$.

Using equations (24a), (24b), and 24(c), the expressions for g(t) and Y(t) from FIGS. 14 and 14, the following relationship can be derived:

$$Y(0) \approx \frac{1}{2}e^{j\phi}\left[\frac{1}{T}\int_{-T/2}^{T/2}(A + h(t) + r(t) - jh^*(t) - jr^*(t))dt\right] \quad (24d)$$

Equation (24d) may be determined as follows. The quantity m(t) is assumed to be the received baseband equivalent of the television signal s(t). Specifically, $m(t)=m_i(t)-jm_q(t)$ in the time domain, or M(ω) in the frequency domain.

The following useful property can be mathematically verified:

$$s(t) = \frac{1}{2}[m(t)e^{j(\omega_p t + \phi)} + m^*(t)e^{-j(\omega_p t + \phi)}] \quad (24d1)$$

Equation (24d1) can be rewritten, using a conventional Fourier transform, in the frequency domain:

$$S(\omega) = \frac{1}{2}[e^{j\phi}M(\omega - \omega_p) + e^{-j\phi}M^*(\omega_p - \omega)] \quad (24d2)$$

Additionally, g(t) can be expressed in the frequency domain as $$G(\omega) = \sin c\left(\frac{\omega T}{2\pi}\right)$$

so that the impulse response function $e^{j\omega_p t}g(t)$ can be written as $$G(\omega - \omega_p) = \sin c\left(\frac{(\omega - \omega_p)T}{2\pi}\right)$$

Figure 15:
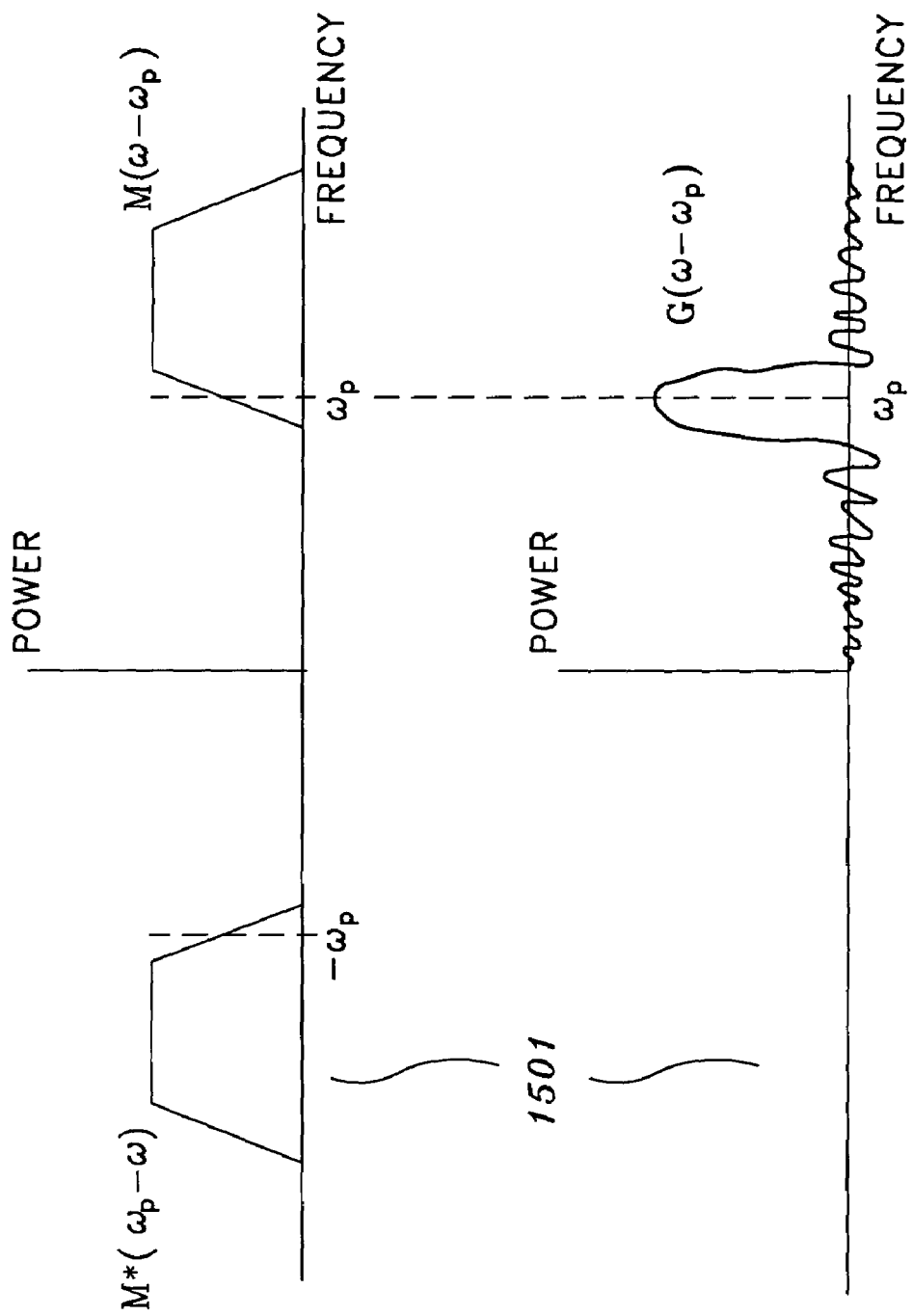
FIG. 15 is a representation of the frequency spectra of a digital television signal and associated transfer function in accordance with an embodiment of the present invention.

Corresponding graphical representations of the respective frequency responses of M, M* and G are shown in FIG. 15. $M(\omega-\omega_p)$ and $M^*(\omega_p-\omega)$ both contain a relatively constant power level over most of their spectra and contain pilot frequencies on one edge. In contrast, the impulse response function $G(\omega-\omega_p)$ has a peak which is centered at $\omega_p$, and a similar peak is not present at $-\omega_p$. Over the interval at issue, the television signal is input into the filter such that the resulting output can be written in the frequency domain as $$Y(0) = \frac{1}{2\pi}\int_{-\infty}^{\infty} S(\omega)G(\omega - \omega_p)d\omega \quad (24d3)$$

Substituting the value of S(ω) from equation (24d2) into equation (24d3) yields the resulting expression $$Y(0) = \frac{1}{2}e^{j\phi}\left[\frac{1}{2\pi}\right]\int_{-\infty}^{\infty}M(\omega - \omega_P)G(\omega - \omega_P)d\omega + \quad (24d4)$$
$$\frac{1}{2}e^{j\phi}\left[\frac{1}{2\pi}\right]\int_{-\infty}^{\infty}M^*(\omega - \omega_P)G(\omega - \omega_P)d\omega$$

Referring back to FIG. 15, it can be concluded that the second integral in equation (24d4) is negligible, provided that $\omega_p$ is sufficiently large relative to the amplitude of the transfer function 1/T. More specifically, as the left hand side 1501 of FIG. 15 demonstrates, $M^*(\omega_p-\omega)\times G(\omega-\omega_p)\to 0$ for $\omega_p \gg 1/T$. In light of this simplifying assumption, the integral based on the Hilbert transform M* can be disregarded and the remaining first integral can be rearranged and expressed as $$\frac{1}{2\pi}\int_{-\infty}^{\infty}M(\omega)G(\omega)d\omega = \int_{-\infty}^{\infty}m(\alpha)g(-\alpha)d\alpha = \frac{1}{T}\int_{-T/2}^{T/2}m(t)dt \quad (24d5)$$

Note that equation (24d5) involves the use of the Fourier transform. Accordingly, $$Y(0) \approx \frac{1}{2}e^{j\phi}\left[\frac{1}{T}\int_{-T/2}^{T/2}m(t)dt\right] = \frac{1}{2}e^{j\phi}\left[\frac{1}{T}\int_{-T/2}^{T/2}(m_i(t) - jm_q(t))dt\right] \quad (24d6)$$

The right hand side of equation (24d6) is identical to the expression for Y(0) in equation 24(d). Now, $$\frac{1}{T}\int_{-T/2}^{T/2}A\,dt = A \quad (24e)$$

Further, because h(t) and h*(t) have period T and have no DC component, then the following equations (similar to equations (21) and (22)) are true:

$$\frac{1}{T}\int_{-T/2}^{T/2}h(t)dt = 0 \text{ and } \frac{1}{T}\int_{-T/2}^{T/2}h^*(t)dt = 0 \quad (24f)$$

To verify the integrity of these method of equation (24d) of estimating the phase angle, assume that the signal r(t) has a zero mean with a variance characterized by the quantity $\sigma_r^2$. The zero mean assumption is reasonable here, in part because data is random in nature and all data levels are equiprobable.

Because 828 data symbols exist in the segment period T, then the expressions $$\frac{1}{T}\int_{-T/2}^{T/2} r(t)\,dt = 0 \text{ and } \frac{1}{T}\int_{-T/2}^{T/2} r^*(t)\,dt = 0$$

represents zero-mean random variables having approximate variances of $$\sigma_r^2/828 \tag{24g}$$

Using the assumptions set forth in equations (24e), (24f) and (24g), and rewriting Y(0) from equation (24d) based on those assumptions yields the following expression for Y(0):

$$Y(0) \approx \frac{1}{2} e^{j\phi}[A + E_i + jE_q] \tag{24h}$$

where $E_i$ and $E_q$ represent orthogonal random variables having respective variances of approximately $\sigma_r^2/828$. Because this variance is small relative to the quantity $A^2$, the phase angle of Y(0) in equation (24h) yields a good estimate of $\phi$. Using the definitions in the ATSC specification, the following numerical values are available:

$$A = 1.25 \tag{24i}$$

$$\sigma_r^2 = \frac{1}{4}(1^2 + 3^2 + 5^2 + 7^2) = 21 \tag{24j}$$

Equations (24i) and (24j) establish that $A^2/\sigma^2 = -11.3$ dB. This means that, with respect to the digital television signal s(t), the energy in the pilot tone is approximately 11.3 dB below the energy in the data portion of the signal r(t). After processing by the receiver's phase-estimation filter in this implementation, the relative energy of the pilot tone in Y(0) is $A^2/(2\sigma_r^2/828)$, or approximately 14.9 dB. These figures reflect that the filter in this implementation provides a processing gain of approximately 26 dB.

2. Accumulation of Segment Intervals

Following the estimation of phase changes from step 1 and equations (20) and (24) above, the accumulated phase-adjusted complex segment interval signal terms may be computed using the following representation:

$$A(t; N) = \sum_{n=0}^{N-1} S(t + nT) e^{-j\phi_n} \tag{25}$$

This is illustrated at step 1230 of FIG. 12. The above procedure amounts to a coherent combination of phase corrected IF signal segments. As equation (25) reflects, each segment is first adjusted by the associated pilot tone phase shift $\phi_n$ estimated in equation set (24) prior to accumulation. Thus, by using the above procedures to estimate phase changes, we now have enough information to accumulate respective segments for correlation purposes. From this information, the appropriate correlation peak may be deduced, and the pseudo-ranges may be calculated, as discussed below. The accumulation step can be readily performed by executable instructions in software using a straightforward summing algorithm, given that previous unknowns (i.e., $\phi_n$) are now known.

By coherently combining phase-corrected IF signal segments, the accumulated term A(t;N) computed in equation (25) in this implementation effectively adds the pilot signal coherently N times. This accumulated expression results in a pilot term having a magnitude stronger than in the original received television signal. As an illustration of this fact, given a frame of N=313 segment intervals, the resulting pilot signal power computed in A(t;313) is $10 \log_{10} 313 - 12 = 13$ dB above the remaining terms.

Based on this illustration, it follows that the mobile receiver in this embodiment can estimate the pilot tone frequency more accurately after the coherent accumulation of the IF signal segments is computed. The receiver may thereupon estimate this frequency following accumulation.

3. Down-Conversion to Baseband

Given the availability of a reasonably accurate estimate of the pilot tone frequency $\omega_p$, the complex accumulated signal from equation (25) is next down-converted to a complex baseband signal by multiplying the expression by $e^{-j\omega_p t}$ to produce $A(t;N)e^{-j\omega_p t}$ as shown in FIG. 12 (step 1240). This expression is used in connection with the complex correlation procedure, described below. Note that, for the purposes of this disclosure, baseband does not require the down-converted signal to reside precisely at baseband. The approximate nature of this calculation may arise from, among other factors, a close but imperfect estimation of the pilot frequency.

4. Complex Correlation

The final step to obtain the complex accumulated correlation is to compute the following expression (step 1260, FIG. 12):

$$C(t;N) = \int_0^T A(\alpha;N) e^{-j\omega_p t} h(\alpha - t)\,d\alpha \tag{26}$$

In the embodiment shown, the computationally intensive correlation operation reflected by equation (26) may be performed once at the end after accumulation, rather than being performed with respect to each of the individual N segment intervals. Performing this correlation operation once at the end can improve accuracy (because, among other reasons, the accumulated signal is more immune to random noise injections) and dramatically reduce computational time at the mobile receiver. In addition, in some embodiments, the mobile receiver may perform the down-conversion and correlation calculations in a single step. As a result, a significant savings in computational power can be achieved, and correlations can be performed faster, thereby allowing the receiver to track position location in up to substantially real time.

Using equations (25) and (26), the mobile receiver in this embodiment correlates both the inphase and quadrature phase components with the real waveform h(t). Ignoring pilot and data modulated signals and focusing only on the segment sync bits waveform, the down-converted complex signal would have the following form:

$$D(t) = [h(t-\tau) + jh^*(t-\tau)]e^{j\phi} \text{ for } \tau \leq t + T_0 \leq T_0 \tag{27}$$

In equation (27), present are the phase term $\phi$, and the unknown beginning of the segment time $\tau$ in the segment interval [0,T]. Autocorrelating both the inphase and quadrature terms with the same waveform h(t) yields the following complex correlator output:

$$C(t;1) = [R_{hh}(t-\tau) + jR^*_{hh}(t-\tau)]e^{j\phi} \text{ for } \tau - T_0 \leq t \leq \tau + T_0 \tag{28}$$

The equation (28) represents the same equation computed above in connection with trigonometric property (1) and equations (16) and (17), above.

In certain embodiments, the receiver may use a complex reference waveform during the correlation computation instead of simply using the real component h(t). Here, H(t) may be used as the reference where $H(t)=h(t)-jh^*(t)$. In this event, the complex correlator output may be represented by $$C(t;1) = \int_0^T D(\alpha)H(\alpha-t)d\alpha \text{ for } \tau-T_0 \le t \le \tau+T_0 = \quad (29)$$

$$\{[R_{hh}(t-\tau)+R_{h^*h^*}(t-\tau)]+j[R_{h^*h^*}(t-\tau)-R_{hh^*}(t-\tau)]\}e^{j\omega\phi}$$

In addition, the following two provable mathematical properties are useful here:

$$R_{h^*h^*}(t)=R^{**}{}_{hh}(t)=R_{hh}(t) \quad (30)$$

and $$R_{h^*h}(t)=R^*{}_{hh}(t)=-R_{hh^*}(t) \quad (31)$$

Using the relationships from (30) and (31), equation (29) can be rewritten as follows:

$$C(t;1)=2[R_{hh}(t-\tau)+jR^*{}_{hh}(t-\tau)]e^{j\phi} \quad (32)$$

Comparing equations (28) and (32) evidences that a receiver using a complex reference waveform as a correlation input produces a similar result, differing in this instance by a factor of 2.

Another alternative to computing the pertinent correlation coefficients is set forth below in the context using matched filtering techniques in connection with a received ATSC digital television signal. In the embodiments discussed, certain simplifying assumptions can be made to produce a correlation result that is reasonably precise. First, the down-converted baseband signal is described. In actual implementations, the down-converted baseband signal has certain second order characteristics and may be more accurately represented by the following expression:

$$D(t)=S(t)e^{-j\omega_p t}=[(d(t)+A)+jd^*(t)]e^{j\phi}+e^{-j2\omega_p t}[(d(t)+A)+jd^*(t)]$$

Here, variable h(t) represents the portion of the modulating signal attributable to the segment synchronization pattern at a time when the segment synchronization signal is centered at t=0. In this event, the pertinent period of the synchronization signal is $-T/2 \le t \le T/2$. The correlation operation to be performed can be expressed by $$C(t)=\int_{-T/2}^{T/2} d(\alpha)h(\alpha-t)d\alpha \text{ for } -T/2 \le t \le T/2$$

Here, because h(t) has a period T, the integral above constitutes a circular correlation.

In embodiments using the ATSC format, signals h(t) and h*(t) have low-pass characteristics in light of their general 6 MHz bandwidth-per-channel limitation. If $\omega_0=2\pi(6 \text{ MHz})$, then the term $e^{-j2\omega_p t}[(d(t)+A)+jd^*(t)]$ lies outside the passband of h(t) and does not contribute to the correlation C(t). Accordingly, this term drops out from the correlation equation.

After removing the complex term above, the following expressions representing the correlation waveform of the synchronization pattern become simplified to $$d_i(t) \approx A+h(t)$$

$$d_q(t) \approx h^*(t)$$

for some $\tau$ and h*(t) represents the Hilbert transform of h(t). In this case, the correlation equation can be rewritten as follows:

$$C(t)=\int_{-T/2}^{T/2}[A+h(\alpha-\tau)-jh^*(\alpha-T)]h(\alpha-\tau)d\alpha$$

Note that h(t) has no DC component, since the binary segment synchronization pattern in this embodiment includes toggling symbols (+1, −1, +1, −1). Accordingly, the pilot term "A" does not contribute to the correlation equation C(t). Then, if we define $$R(t)=\int_0^T h(\alpha)h(\alpha-t)d\alpha \text{ and}$$

$$R^*(t)=\int_0^T h^*(\alpha)h(\alpha-t)d\alpha,$$

the following equation for the correlation results:

$$C(t) \approx R(t-\tau)-jR^*(t-\tau) \quad (33)$$

Next, to solve the correlation function of equation (33), both sides of the equation can be squared to produce $$|C(t)|^2 \approx R^2(t-\tau)+R^{*2}(t-\tau) \quad (34)$$

Because the synchronization signal is centered at t=0 in this illustration, the quantity $|C(t)|^2$ in equation (34) is maximized when $t=\tau$. Consequently, to determine the offset $\tau$ of the segment synchronization pattern (and ultimately the pseudorange and position information of the user device), the processor or other component in the user device can first compute the quantity $|C(t)|^2$ for $-T/2 \le t \le T/2$. Having computed that quantity, the processor can then determine the value of $\tau$ that maximizes the known $|C(t)|^2$.

The embodiment described above is insensitive to a fixed signal phase offset. In particular, if the carrier phase estimator includes some fixed phase shift $e^{j\phi}$, then the correlation equation (33) changes to $$C(t) \approx e^{j\phi}\lfloor R(t-\tau)-jR^*(t-\tau)\rfloor \quad (35)$$

Equations (34) and (35) reflect that the quantity $|C(t)|^2$ is not significantly affected by the value of $\phi$. As such, even if the carrier phase estimator includes a fixed offset, that offset will not affect the matched filter procedures and corresponding determination of $\tau$ as described in this section.

Figure 16A:
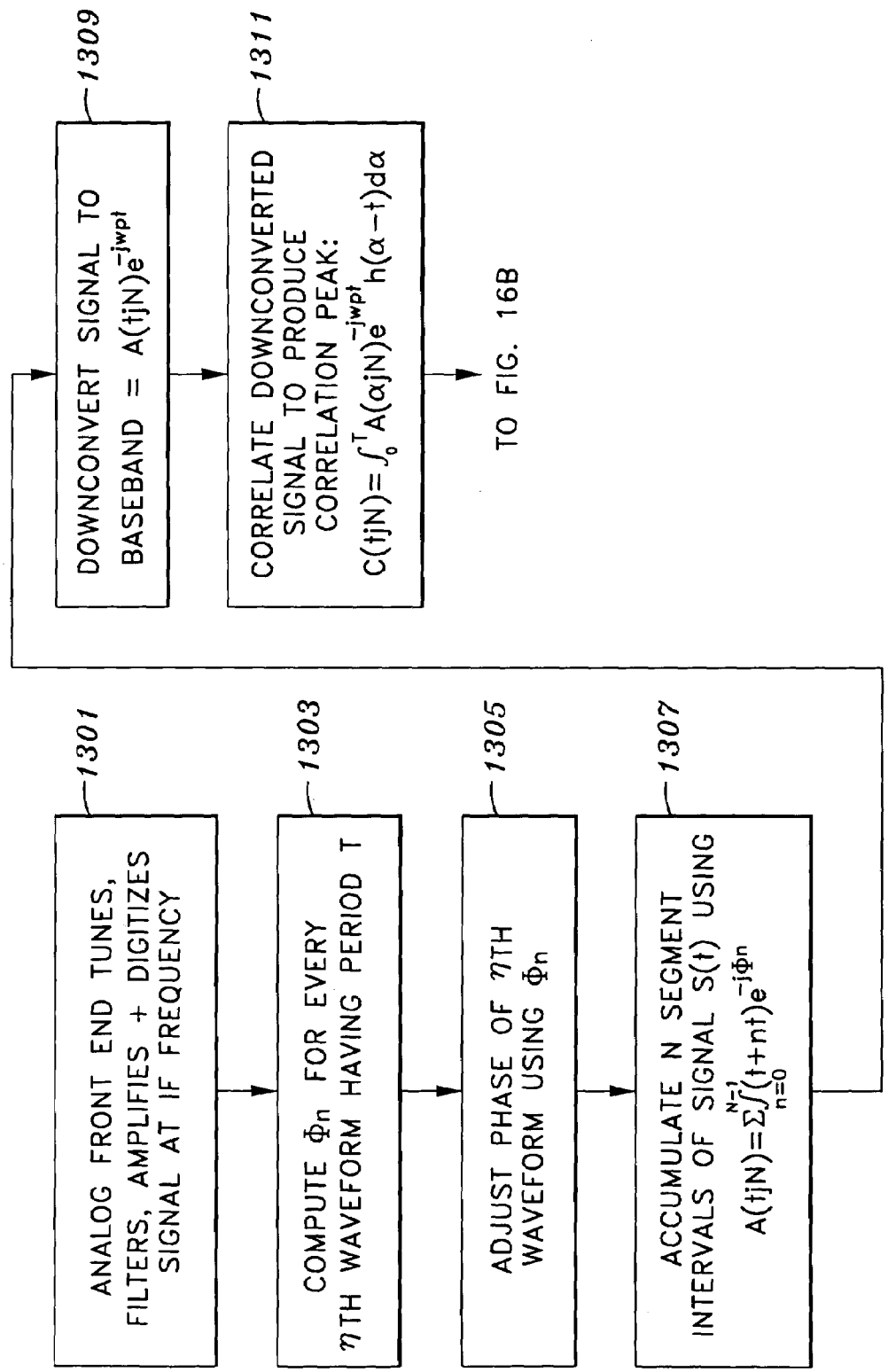
FIGS. 16A and 16B are a flow diagram of an algorithm for computing a pseudo-range of a received television signal in accordance with an embodiment of the present invention.
Figure 16B:
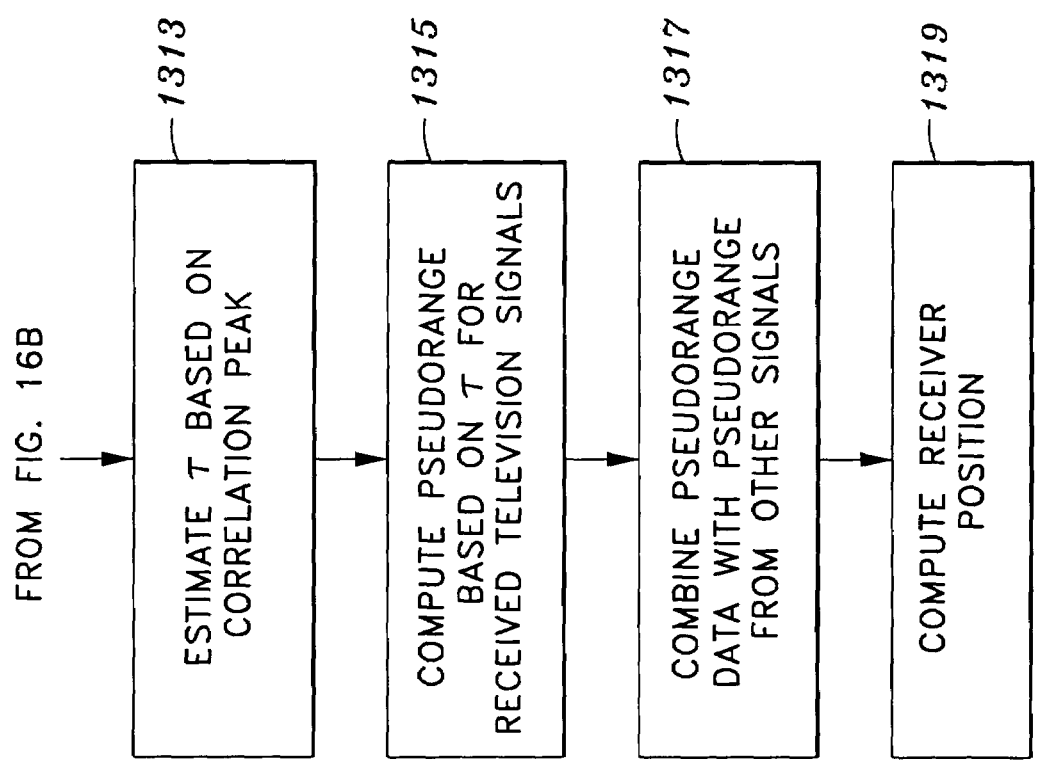

FIGS. 16A and 16B show a flow diagram of an algorithm for computing a correlation peaks and hence the relative time delay $\tau$ of an incoming television signal in accordance with one embodiment of the present invention. Before the commencement of the algorithm on a suitable processing device, the analog front end circuitry of the receiver tunes, filters, retimes, amplifies and digitizes the incoming signal in a manner described above (step 1301). Once the broadcast television signal is digitized by the analog-to-digital converter, the signal is ready for input into a processing device for further manipulation. In this example, the digitized signal from an appropriate set of analog to digital converters resides at an intermediate frequency (IF) such that successive signal intervals of period T remain in a broadband signal format. At step 1303, a processing unit computes the relative phase offsets $\phi$, for each segment interval. In the case of an ATSC-based signal, the segment interval would constitute a data packet (or alternatively, a field synchronization segment) of 832 symbols in length, or a duration T of 77.3 μS each. Within each such interval is included a known signal component—namely, the four symbol data synchronization segment at the beginning of the packet. For different types of television signals, it will be appreciated that different symbol lengths may be involved, and the types of known signal components may vary. The computations of the phase offsets $\phi$ are performed for successive intervals of signal segments so that each offset associated with each of the received segments are known. When a sufficient number of segments are computed based on criteria such as the computational capacity of the receiver and the desired accuracy of the calculation of the time delay coefficient τ, the measurements of the phase angle may conclude. Concurrently, or shortly thereafter (depending on the software implementation), the phase of each of the N IF waveforms is adjusted based on the calculated phase offset (step 1305) from step 1303. With that adjustment, the successive segment intervals may be accumulated together as shown in step 1307. Depending on the embodiment, the accumulation process may occur after each phase angle is computed for a given segment interval, or it may occur after all of the necessary phase offsets have been recorded. At step 1309, the accumulated signal A(t;N) is downconverted to a baseband (or substantially baseband) signal by multiplying the accumulated signal A(t;N) by an exponent containing an estimated or known pilot frequency.

Next, at step 1311, the resulting baseband accumulated signal is correlated with the reference waveform (the latter constituting a representation of the data synchronization segment in this example) to establish a correlation function with a series of peaks. The first peak which ordinarily corresponds to a line of sight reception of the television signal without multipath interference, is chosen from which to calculate the relative time delay between the transmission of the known signal component at the television transmitter to the reception of the commencement of that component at the receiver.

Continuing to FIG. 16B, using conventional methods, this correlation peak is used to calculate the quantity τ (step 1313). Based on the calculation of τ, an appropriate pseudo-range for the received television signal is calculated using one of a variety of known methods (step 1315). The pseudo-range in step 1315 may be calculated at the receiver; alternatively, the time delay information from the receiver may be transmitted to a remote device such as a location server, which may instead perform the calculation. The specific location where the pseudo-range itself is computed is not essential to an understanding of the present invention. In step 1317, the pseudo-range data computed by the receiving device may then be compared with similar pseudo-range data obtained from other receiving devices using GPS signals or television signals, as is well known in the art. This step may likewise be accomplished by the receiver itself, or more typically, by an external device in communication with the receiver over a wireless network. At step 1319, the position of the receiver is computed based upon these pseudo-ranges. In the case where a separate device (such as, for instance, a location server) performs these computations, the resulting position information can be relayed back to the receiving device through the wireless network or other means.

Computer-executable process steps of the present invention can be executed on any computer including PCs, workstations, servers, mainframes, and supercomputers without departing from the scope of the present invention. The computer can have any type of CPUs, including Intel CPU, a PowerPC CPU, a MIPS RISC CPU, a SPARC CPU, a DSP, an Alpha CPU or a proprietary CPU for a mainframe or supercomputer, without departing from the scope of the present invention. The computer-readable medium can be any data storage medium including magnetic disk and tape media, optical media, and magneto-optical media without departing from the scope of the present invention. The computer-readable medium can also be a ROM or flash ROM for firmware. The computer-executable process steps of the present invention can also be executed by a dedicated and/or specialized digital and/or analog circuits without departing from the scope of the present invention.

Using the A TSC Field Synchronization Segment

The method described here has focused on correlating the accumulated phase-corrected segment intervals with the known waveform of the 4 segment synchronization bits. The resulting correlation peak can be used to compute a pseudo-range for determining the receiving device's position location. These segment synchronization bits occur in every segment interval transmitted by the ATSC digital TV broadcast signal. As shown in FIG. 9, the Field Synchronization Segments 910 are also known signals terms that can be used for computing a pseudo-range and providing additional means for determining the receiving device's position location. We describe next how this can be done using the method described in this application.

Note that correlating the accumulated phase-corrected segment intervals with the known segment synchronization bits results in a correlation peak that identifies for the receiver the previously unknown beginning of the segment interval in the received broadcast signal. This is because these 4 segment synchronization bits are always at the beginning of each ATSC digital TV transmitted signal's segment interval. Once this correct segment interval for the received signal is determined a new corrected segment interval can be used for computing additional accumulated phase-corrected segment intervals. This corrected segment interval is the receiver's estimate of the actual segment intervals in the received broadcast signal.

Using the corrected segment intervals for the received signal, the method described here is extended to creating 313 accumulated phase-corrected segment intervals. This corresponds to the 313 segments in a half frame shown in FIG. 9. Here each received segment interval is phase corrected and added to one of the 313 accumulated segment intervals. These accumulations are done in sequence such that a phase corrected segment interval is added to a particular accumulator once every 313 segment time intervals. Thus each of these 313 accumulators have a new phase-corrected segment added to it once every 313×77.3 microseconds=24.2 milliseconds or 41.3 times a second.

Only one of the 313 accumulated phase-corrected segment intervals corresponds to the fixed Field Synchronization Segment as shown in FIG. 9. Except for the few bits that differ between Field Synchronization Segment #1 and #2, this accumulated segment intervals will coherently combine the phase-corrected segment intervals resulting in much larger sample magnitude values than the other 312 accumulated phase-corrected segment intervals which consists of random data symbols. All of these segments, of course, still have the common pilot signal and segment synchronization bits that add coherently in all the accumulated phase-corrected segment intervals.

After some accumulations, the accumulated segment interval containing the Field Synchronization Segment will have total energy that exceeds the other 312 accumulated segment intervals with high probability. This accumulated segment interval can be easily identified using some threshold on the total energy in each of these 313 accumulated segment intervals. Once this accumulated segment interval containing the Field Synchronization Segment is identified it can be correlated with the known waveform of the Field Synchronization Segment. The resulting correlation output can be used to compute a pseudo-range which can be combined with the earlier pseudo-range measurement based on the segment synchronization bits discussed earlier.

Application to the Analog NTSC Broadcast

Like the digital ATSC standard, the analog National Television System Committee (NTSC) broadcast signals also contain a pilot signal and other known synchronization signal components that can be used for the receiver's position location. The method described in this application applies directly to the analog NTSC broadcast signals. For example the horizontal scan synchronization signal occurs in each horizontal scan time of 63.6 microseconds. This 63.6 microsecond is equivalent to the segment time interval discussed earlier while this horizontal scan synchronization signal plays a similar role to the segment synchronization bit waveform of the digital ATSC standard. For these analog TV broadcast signals there is also a known Ghost Canceling Reference (GCR) signal that occurs periodically which is used by the TV receivers to combat multipath during signal propagation from the transmitter to the receivers. This GCR signal is analogous to the Field Synchronization Segment signal of the digital ATSC broadcast signal. The method of this application easily extends to all other types of analog TV broadcast signals.

Extension to Other Digital TV Standards

The European Telecommunications Standards Institute (ETSI) established the Digital Video Broadcasting—Terrestrial (DVB-T) standard which is based on the use of Orthogonal Frequency Division Multiplexing (OFDM) signals. This method described here can be applied to DVB-T and the closely related Japanese Integrated Services Digital Broadcasting—Terrestrial (ISDB-T) system. The 8K mode of the DVB-T system, for example, consists of 6,816 OFDM carriers where each carrier is QAM modulated (QPSK is a special case) with a coded data symbol of 896 microsecond duration. The entire set of 6,816 data symbols is referred to as one symbol of this DVB-T broadcast signal. The individual QAM modulated symbols with carriers of 896 microsecond duration are sometimes called cells. Many of these cells are fixed and used for the purpose of synchronization at the TV receivers. These known synchronization cells, called pilot carriers or cells, can be used to determine the receiver's position location based on the method of this application.

For the 8K mode of the DVB-T broadcast standard there are 177 continual pilot cells that occur on the same carrier positions among the 6,916 OFDM carriers in every symbol time of 896 microsecond duration. In addition there are scattered pilot cells that have a pattern that repeats every four symbol times. Reference waveforms based on these known pilot cells can be used to correlate with the received broadcast signal to compute pseudo-ranges for the purpose of position location. Here it is natural to take samples of the Fourier Transform of the broadcast signal for time intervals of one symbol time (896 microsecond) or 4 symbol times (3594 microsecond).

Extension to Other OFDM Broadcast Signals

The method can be applied to other OFDM broadcast signals such as the ETSI Digital Audio Broadcast (DAB) and the United States In-Band On-Channel (IBOC) digital audio broadcast systems. OFDM audio broadcast signals are also used by the terrestrial relays of the Satellite Digital Audio Radio Service (SDARS) systems of Sirius and XMRadio. All these OFDM broadcast signals have known synchronization signal components where the method applies for the purpose of position location.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A method of determining, at a receiving device used for position location, a correlation peak of a broadband television waveform comprising a plurality of segment intervals, each segment interval comprising a known signal component, the method comprising:

estimating segment phase changes for each of the segment intervals;
correcting each of the segment intervals for segment phase changes using the estimated segment phase changes;
accumulating phase-corrected segment intervals to form an accumulated expression;
converting the accumulated expression to a baseband signal; and
correlating the accumulated baseband signal with the known signal component to determine an associated correlation peak.

2. The method of claim 1, wherein the associated correlation peak is used to estimate an appropriate pseudo-range for the television signal.

3. The method of claim 2, wherein the estimated pseudo-range is used with other estimated pseudo-ranges associated with other received signals to determine a location of the receiving device.

4. The method of claim 3, wherein the location determination using the pseudo-ranges is performed by a location server coupled to the receiving device over a wireless network.

5. The method of claim 1 wherein a filter is used to estimate the segment phase changes.

6. The method of claim 1 wherein the plurality of segment intervals are at an intermediate frequency (IF).

7. The method of claim 1 wherein the accumulated phase-corrected segment intervals are at an intermediate frequency (IF).

8. The method of claim 1 wherein the estimating the segment phase changes, the accumulating the phase-corrected segment intervals, the converting the accumulated expression to the baseband signal, and the correlating the accumulated baseband signal are performed in software.

9. The method of claim 8 wherein the software is executed on a digital signal processor (DSP).

10. The method of claim 1 wherein the broadband television signal is an American Television Standards Committee (ATSC) digital television signal.

11. The method of claim 10 wherein the known signal component of the broadband television signal comprises a known digital sequence in the ATSC frame.

12. The method of claim 11 wherein the known digital sequence comprises a synchronization code.

13. The method of claim 12 wherein the synchronization code comprises a data synchronization sequence.

14. The method of claim 12, wherein the synchronization code comprises a Field Synchronization Segment within an ATSC data frame.

15. The method of claim 1, wherein the broadband television signal is an European Telecommunications Standards Institute (ETSI) Digital Video Broadcasting -Terrestrial (DVB-T) signal.

16. The method of claim 15, wherein the known components of the broadband television signal comprise continual pilot carriers and scattered pilot carriers.

17. The method of claim 1, wherein the broadband television signal is a Japanese Integrated Services Digital Broadcasting-Terrestrial (ISDB-T) signal.

18. The method of claim 1, wherein the broadband television signal is an analog television signal.

19. The method of claim 18, wherein the known component of the broadband television signal is selected from the group comprising:
a horizontal synchronization pulse;
a horizontal blanking pulse;
a horizontal blanking pulse and a horizontal synchronization pulse;

a ghost canceling reference signal; and a vertical interval test signal.

20. A method for calculating a transmission time of a known component of a television signal from a transmitter to a mobile receiver, comprising:

receiving packets comprising N successive segment intervals of the television signal at an antenna at the mobile receiver, each segment interval comprising a period of approximately T seconds;

amplifying and filtering the N segment intervals;

digitizing the N segment intervals using at least one analog-to-digital converter;

estimating, for each of the N segment intervals using a processing unit, a corresponding set of relative phase offsets $\underline{\phi}=(\phi_0,\phi_1,\ldots,\phi_{N-1})$ among the N segment intervals;

adjusting the phase of each of the N segment intervals using the set of phase offsets $\underline{\phi}$;

accumulating the phase-adjusted N segment intervals over the period T;

correlating the accumulated N segment intervals with a reference waveform comprising the known component; and using the correlation output to estimate the transmission time.

21. The method of claim 20 wherein the transmission time estimate is used to calculate a corresponding pseudo-range.

22. The method of claim 21 wherein the pseudo-range estimating is performed by the mobile receiver.

23. The method of claim 20 wherein the transmission time estimate is sent to a location server by the mobile receiver.

24. The method of claim 23 wherein the location server calculates a corresponding pseudo-range of the television signal based on the transmission time estimate sent by the mobile receiver.

25. The method of claim 21 wherein the corresponding pseudo-range is used in combination with other pseudo-ranges associated with other received signals to calculate a corresponding location of the mobile receiver.

26. The method of claim 25 wherein the location calculations are performed by a location server coupled to the mobile receiver via a wireless network.

27. The method of claim 20 wherein the estimating, adjusting, accumulating, and correlating are performed in software by the processing unit.

28. The method of claim 20 further comprising:

converting the accumulated N signal intervals to a baseband format prior to the correlating the accumulated N segment intervals with the reference waveform.

29. The method of claim 28 wherein the accumulated N segment intervals are at an intermediate frequency (IF) prior to the converting to baseband.

30. The method of claim 20 wherein the estimating each corresponding phase offset further comprises using a filter.

31. The method of claim 30 wherein the filter comprise a Finite Impulse Response (FIR) filter.

32. The method of claim 30 wherein a transfer function of the filter is configured to produce a filter output signal for each of the N segment intervals comprising the corresponding phase offset.

33. The method of claim 27 wherein the processing unit comprises a digital signal processor (DSP).

34. The method of claim 20 wherein the television signal is an American Television Standards Committee (ATSC) digital television signal.

35. The method of claim 20 wherein the known signal component of the television signal comprises a known digital sequence in the ATSC frame.

36. The method of claim 35 wherein the known digital sequence comprises a synchronization code.

37. The method of claim 36 wherein the synchronization code comprises a data synchronization sequence.

38. The method of claim 36, wherein the synchronization code comprises a Field Synchronization Segment within an ATSC data frame.

39. The method of claim 1, wherein the television signal is a European Telecommunications Standards Institute (ETSJ) Digital Video Broadcasting-Terrestrial (DVB-T) signal.

40. The method of claim 39, wherein the known components of the television signal comprise continual pilot carriers and scattered pilot carriers.

41. The method of claim 20, wherein the television signal comprises a Japanese Integrated Services Digital Broadcasting-Terrestrial (ISDB-T) signal.

42. The method of claim 20, wherein the television signal comprises an analog television signal.

43. The method of claim 42, wherein the known component of the analog television signal is selected from the group comprising:

a horizontal synchronization pulse;

a horizontal blanking pulse;

a horizontal blanking pulse and a horizontal synchronization pulse;

a ghost canceling reference signal; and a vertical interval test signal.

44. Computer-readable media embodying a program of instructions executable by a computer program to perform a method of determining, at a receiving device used for position location, a correlation peak of a broadband television waveform comprising a plurality of segment intervals, each segment interval comprising a known signal component, the method comprising:

estimating segment phase changes for each of the segment intervals;

correcting each of the segment intervals for segment phase changes using the estimated segment phase changes:

accumulating phase-corrected segment intervals to form an accumulated expression;

converting the accumulated expression to a baseband signal; and correlating the accumulated baseband signal with the known signal component to determine an associated correlation peak.

45. The computer-readable media of claim 44 wherein the associated correlation peak is used to estimate an appropriate pseudo-range for the television signal.

46. The computer-readable media of claim 45 wherein the estimated pseudo-range is used with other estimated pseudo-ranges associated with other received signals to determine a location of the receiving device.

47. The computer-readable media of claim 44 wherein the plurality of segment intervals is at an intermediate frequency (IF).

48. The computer-readable media of claim 44 wherein the accumulated phase-corrected segment intervals are at an intermediate frequency (IF).

49. The computer-readable media of claim 44 comprising instructions configured to be executed on a digital signal processor (DSP).

50. The computer-readable media of claim 44 wherein the broadband television signal is an American Television Standards Committee (ATSC) digital television signal.

51. The computer-readable media of claim 50 wherein the known signal component of the broadband television signal comprises a known digital sequence in the ATSC frame.

52. The computer-readable media of claim 51 wherein the known digital sequence comprises a synchronization code.

53. The computer-readable media of claim 52 wherein the synchronization code comprises a data synchronization sequence.

54. The computer-readable media of claim 52 wherein the synchronization code comprises a Field Synchronization Segment within an ATSC data frame.

55. The computer-readable media of claim 44 wherein the broadband television signal is an European Telecommunications Standards Institute (ETSJ) Digital Video Broadcasting-Terrestrial (DVB-T) signal.

56. The computer-readable media of claim 45 wherein the known component of the broadband television signal comprise continual pilot carriers and scattered pilot carriers.

57. The method of claim 44, wherein the broadband television signal comprises a Japanese Integrated Services Digital Broadcasting-Terrestrial (ISDB-T) signal.

58. The method of claim 44, wherein the broadcast television signal comprises an analog television signal.

59. The method of claim 58, wherein the known component of the analog television signal is selected from the group comprising:
- a horizontal synchronization pulse;
- a horizontal blanking pulse;
- a horizontal blanking pulse and a horizontal synchronization pulse;
- a ghost canceling reference signal; and
- a vertical interval test signal.

60. A mobile receiving apparatus for use in determining position location based in part on a broadcast television signal comprising a plurality of successive segment intervals, each interval comprising a known signal component, the apparatus comprising;
 (a) a power source;
 (b) an antenna for receiving the signal;
 (c) tuning means for selecting the desired television signal;
 (d) filtering and amplifying means;
 (e) an analog-to-digital converter for digitizing the television signal; and
 (f) a processing unit for
  (i) estimating segment phase changes for each of the segment intervals;
  (ii) correcting each of the segment intervals for segment phase changes using the estimated segment phase changes:
  (iii) accumulating phase-corrected segment intervals to form an accumulated expression; and
  (iv) correlating the accumulated baseband signal with the known signal component to produce an associated correlation output function.

61. The apparatus of claim 60, further comprising means for converting the television signal to a baseband format.

62. The apparatus of claim 60, wherein the processing unit comprises a digital signal processor (DSP).

63. The apparatus of claim 60, further comprising a filter for the estimating the segment phase changes.

* * * * *

UNITED STATES PATENT AND TRADEMARK OFFICE
CERTIFICATE OF CORRECTION

PATENT NO. : 7,692,587 B2  Page 1 of 1
APPLICATION NO. : 10/946070
DATED : April 6, 2010
INVENTOR(S) : Rabinowitz et al.

It is certified that error appears in the above-identified patent and that said Letters Patent is hereby corrected as shown below:

Col. 1 line 24, CROSS-REFERENCES TO RELATED APPLICATIONS, please replace "10/353,699" with --10/353,669--.

Signed and Sealed this

Twelfth Day of October, 2010

David J. Kappos
*Director of the United States Patent and Trademark Office*